United States Patent
Lee et al.

(10) Patent No.: US 10,492,223 B2
(45) Date of Patent: Nov. 26, 2019

(54) CHANNEL ACCESS FOR MULTI-USER COMMUNICATION

(71) Applicant: NEWRACOM, INC., Irvine, CA (US)

(72) Inventors: Daewon Lee, Irvine, CA (US); Yujin Noh, Irvine, CA (US); Sungho Moon, Irvine, CA (US); Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 56 days.

(21) Appl. No.: 15/161,121

(22) Filed: May 20, 2016

(65) Prior Publication Data

US 2016/0345362 A1    Nov. 24, 2016

Related U.S. Application Data

(60) Provisional application No. 62/167,762, filed on May 28, 2015, provisional application No. 62/165,871, (Continued)

(51) Int. Cl.
   *H04W 74/08* (2009.01)
   *H04W 74/06* (2009.01)

(52) U.S. Cl.
   CPC ........ *H04W 74/0816* (2013.01); *H04W 74/06* (2013.01)

(58) Field of Classification Search
   USPC .......................................................... 370/329
   See application file for complete search history.

(56) References Cited

U.S. PATENT DOCUMENTS

| 2011/0194644 A1* | 8/2011 | Liu | H04L 5/0023 375/295 |
| 2011/0255618 A1* | 10/2011 | Zhu | H04B 7/0413 375/260 |

(Continued)

OTHER PUBLICATIONS

LAN/MAN Standards Committee of the IEEE Computer Society, "IEEE P802,11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Gregory B Sefcheck
*Assistant Examiner* — Majid Esmaeilian
(74) *Attorney, Agent, or Firm* — Morgan, Lewis & Bockius LLP

(57) ABSTRACT

In wireless communications, an access point may decrement multiple backoff counters. Each backoff counter may be associated with a respective access function. A first access function may be associated with downlink transmission of data of a first access category. A second access function may be associated with downlink transmission of a trigger frame for facilitating uplink multi-user transmission. The AP may transmit at least one of a first downlink frame or a trigger frame based at least on the decremented backoff timer associated with the first and second access functions. A station may receive the first downlink frame or the trigger frame. If the trigger frame is received, the station may transmit a second frame to the AP based on an indication of an access category contained in the trigger frame. Other methods, apparatus, and computer-readable media are also disclosed.

16 Claims, 37 Drawing Sheets

Related U.S. Application Data filed on May 22, 2015, provisional application No. 62/164,767, filed on May 21, 2015.

(56) References Cited

U.S. PATENT DOCUMENTS

| | | | | |
|---|---|---|---|---|
| 2012/0008490 | A1* | 1/2012 | Zhu | H04W 74/0841 370/216 |
| 2012/0051342 | A1* | 3/2012 | Liu | H04W 72/10 370/338 |
| 2014/0153463 | A1* | 6/2014 | Park | H04W 52/0216 370/311 |
| 2014/0269544 | A1* | 9/2014 | Zhu | H04L 1/1671 370/329 |
| 2015/0236822 | A1* | 8/2015 | Pirskanen | H04L 1/1812 370/329 |
| 2016/0037558 | A1* | 2/2016 | Malik | H04W 74/08 370/329 |
| 2016/0037559 | A1* | 2/2016 | Malik | H04W 74/08 370/329 |
| 2016/0073340 | A1* | 3/2016 | Xue | H04W 52/0212 455/522 |
| 2016/0174225 | A1* | 6/2016 | Patil | H04W 68/005 370/329 |
| 2016/0227533 | A1* | 8/2016 | Josiam | H04W 74/006 |
| 2016/0345362 | A1* | 11/2016 | Lee | H04W 74/0816 |
| 2017/0126363 | A1* | 5/2017 | Wang | H04L 1/0061 |
| 2017/0170937 | A1* | 6/2017 | Chun | H04L 5/0048 |
| 2017/0311310 | A1* | 10/2017 | Ryu | H04W 72/0413 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

CHANNEL ACCESS FOR MULTI-USER COMMUNICATION

CROSS-REFERENCE TO RELATED APPLICATIONS

This application claims the benefit of priority from U.S. Provisional Application No. 62/164,767, entitled "EDCA MULTIPLEXING METHODS FOR UPLINK MULTI-USER TRANSMISSION AND RECEPTION," filed May 21, 2015; U.S. Provisional Application No. 62/165,871, entitled "TRANSMIT OPPORTUNITY TRANSFER AND MEDIUM RECOVERY METHODS FOR UPLINK MULTI-USER TRANSMISSIONS," filed May 22, 2015; and U.S. Provisional Application No. 62/167,762, entitled "EDCA FOR UPLINK MULTI-USER TRANSMISSION AND RECEPTION," filed May 28, 2015, all of which are incorporated herein by reference in their entirety.

TECHNICAL FIELD

The present description relates in general to wireless communication systems and methods, and more particularly to, for example, without limitation, channel access for multi-user communication.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

Figure 1:
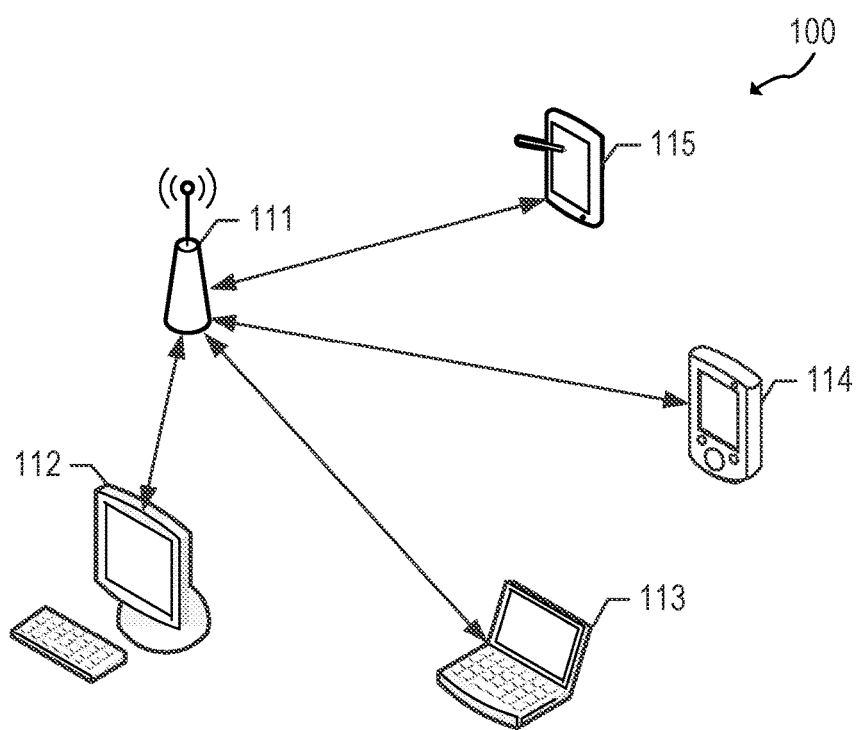
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Systems and methods are disclosed for facilitating medium access for multi-user (MU) transmissions. One or more implementations of such systems and methods may allow obtaining/granting medium usage (e.g., fair medium usage) for access points (APs) and stations (e.g., non-AP stations) with various access category (e.g., quality of service) data packets. Further, multiplexing of different access category data packets may be carried out in MU transmission and reception. In some aspects, such multiplexing may allow efficient use of the medium (e.g., wireless medium) and increase data packet packing efficiency. In facilitating medium access (e.g., fairness of medium usage among APs and stations), one or more implementations of the subject technology may perform transmission opportunity (TXOP) sharing, TXOP ownership transfer, and/or medium recovery during MU transmissions. In some aspects, a trigger frame may include an interframe spacing indication for UL MU transmissions (e.g., to facilitate medium recovery). The subject technology may be utilized in Institute of Electrical and Electronics Engineers (IEEE) systems, such as high throughput (HT), very high throughput (VHT), and high efficiency (HE) WLAN.

In one or more aspects, different data streams processed by a media access control (MAC) may be associated with different priority levels. In some aspects, the data streams may be categorized into different access categories (ACs), with each access category being associated with a respective priority level. In an aspect, the term priority is used interchangeably with priority level.

An AC may be, or may refer to, a label for a common set of enhanced distributed channel access (EDCA) parameters used by a quality of service (QoS) station to contend for a channel in order to transmit MAC service data units (MSDUs) with certain priorities. The EDCA may be, or may refer to, a prioritized carrier sense multiple access with collision avoidance (CSMA/CA) access mechanism used by QoS stations in a QoS basic service set (BSS). In some cases, this access is also used by a QoS AP and may operate concurrently with hybrid coordination function (HCF) controlled channel access (HCCA). An EDCA function (EDCAF) may be, or may refer to, a logical function in a QoS station or QoS AP that determines, using EDCA, when a frame in a transmit queue with the associated AC is permitted to be transmitted via the medium (e.g., wireless medium). In an aspect, there is one EDCAF per AC.

In some aspects, the ACs may include a voice (VO) access category, a video (VI) access category, a best effort (BE) access category, and a background (BK) access category, denoted as AC-VO, AC-VI, AC-BE, and AC-BK, respectively. In an aspect, the ACs may be in order of priority, from highest to lowest priority: AC-VO, AC-VI, AC-BE, and AC-BK.

In some aspects, an arbitration interframe space (AIFS) and backoff time associated with a frame may be based on an AC (e.g., a primary AC) associated with the frame. For instance, a frame that contains AC-BE data may be associated with the access category of best effort. In an aspect, the AIFS duration and backoff time may be inversely related to a priority of the AC, such that an AC of higher priority is associated with a lower AIFS duration and, statistically, a lower backoff time. Thus, the probability of transmitting a frame associated with a higher priority AC is higher than the probability of a transmitting a frame associated with a lower priority AC.

In one or more implementations, the AP may transmit a trigger frame to facilitate UL MU transmission. The trigger frame may be utilized to solicit response frames from one or more stations. For simultaneous response frames, the one or more stations may transmit their response frames using UL MU transmission technology, such as UL MU orthogonal frequency division multiple access (OFDMA) and/or UL MU multi-input multi-output (MIMO).

A trigger frame may be a frame sent by an AP that seeks data, control, or management frame response(s) from stations that participate in a subsequent UL MU frame. The trigger frame may be utilized to initiate the simultaneous MU transmission in OFDMA. In an aspect, a trigger frame may include, for example, some or all of the following features: (a) a list of stations (STAs) that an access point (AP) seeks a response from; (b) resource allocation information for each STA (e.g., a subband assigned to each STA); and/or (c) attributes of the expected UL MU frame, such as the duration, bandwidth, etc., among other features. In other words, the trigger frame may be used to allocate resource for UL MU transmission and to solicit an UL MU transmission from the participating stations in response to the trigger frame. The term "resource" may refer to, for example, a bandwidth (e.g., a subband(s), frequencies, frequency band(s)), time/duration that the STAs expect to occupy a transmission medium, and/or possibly a number of spatial streams that the STAs may use.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
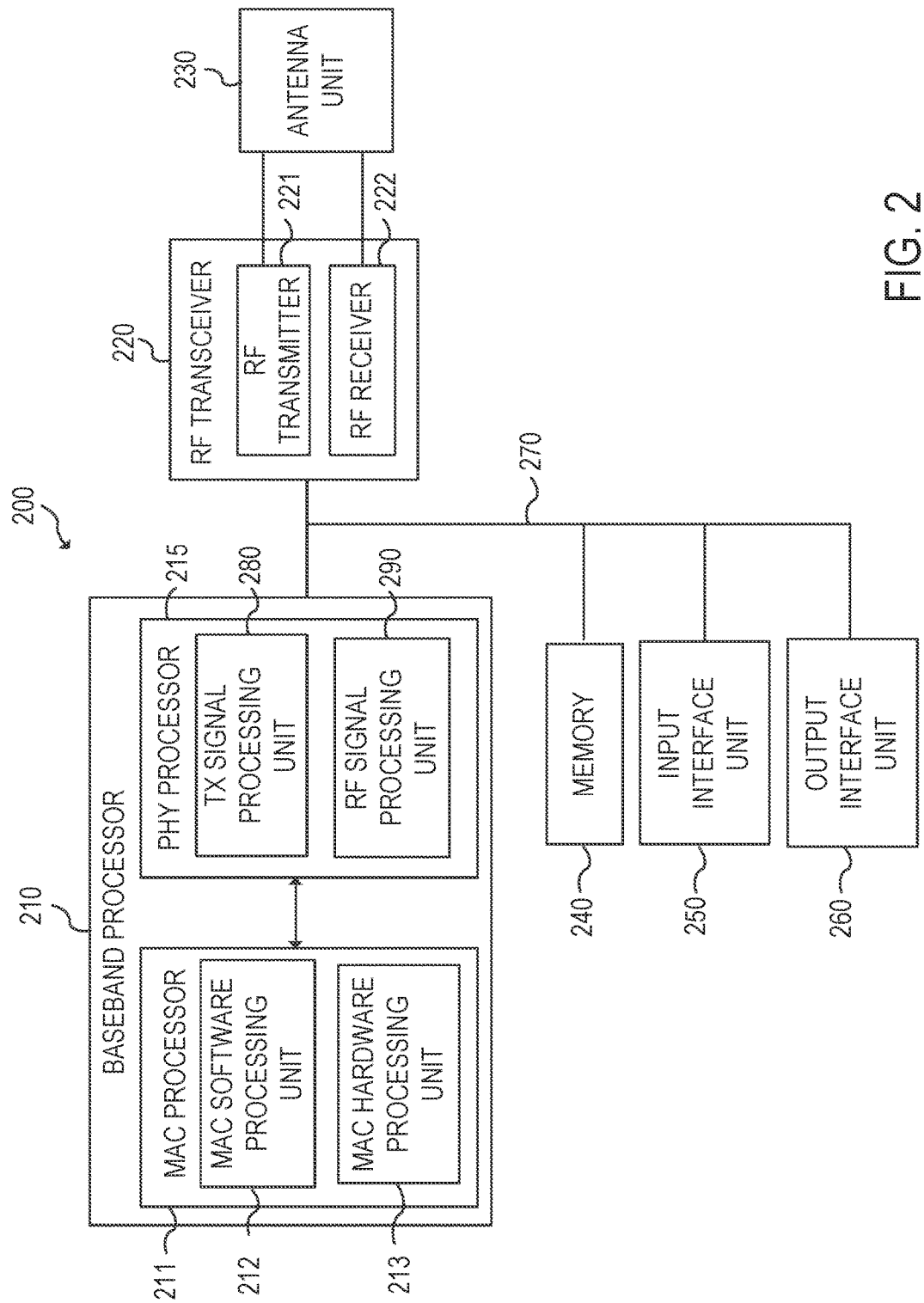
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3:
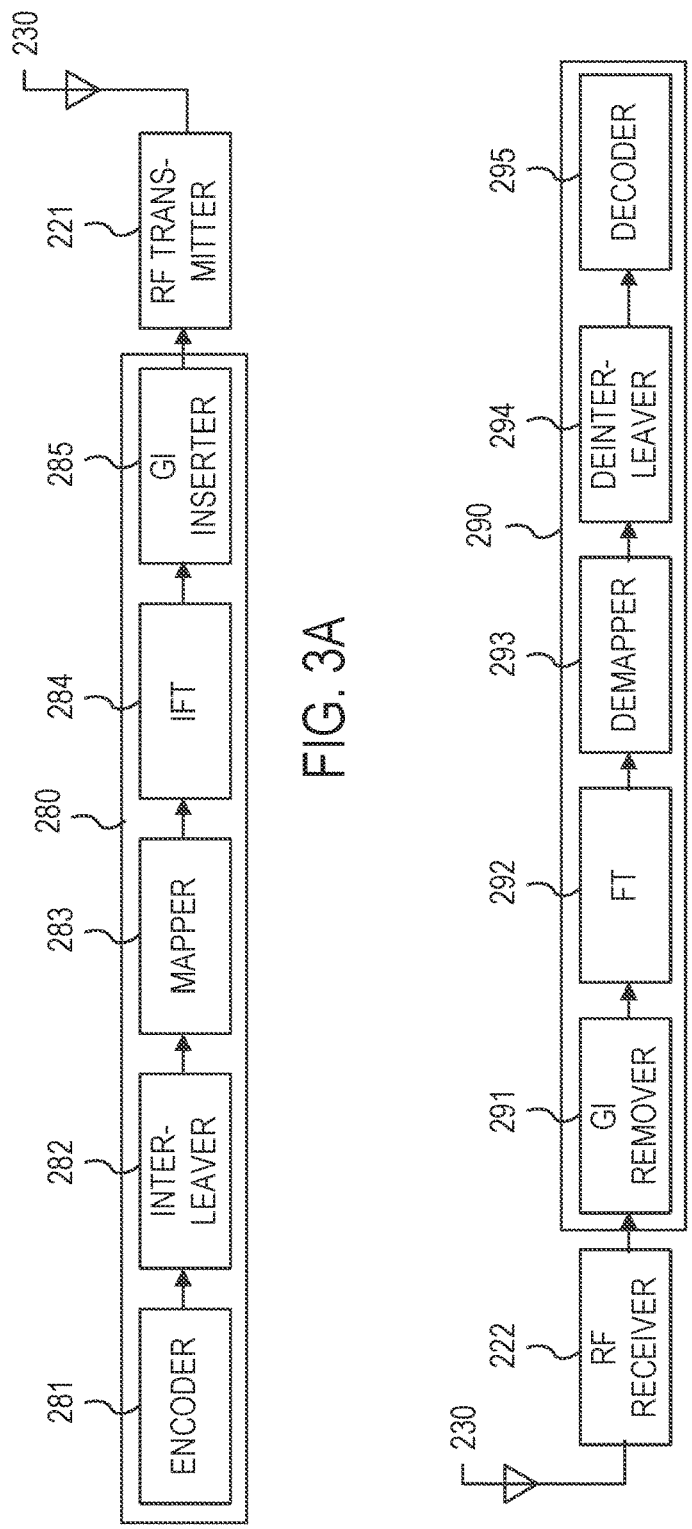
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
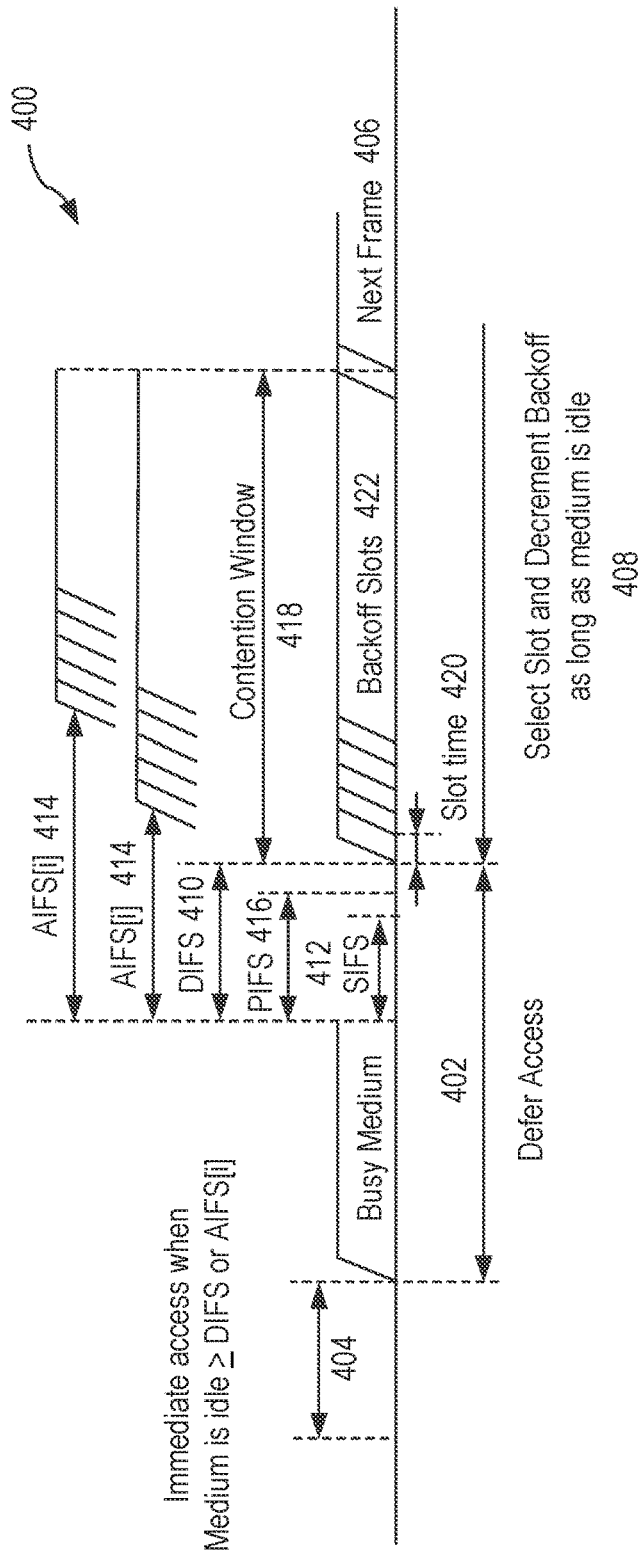
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

In an aspect, the one or more backoff slots 422 may be collectively referred to as a backoff time. In an aspect, the backoff time may be based on a random (e.g., pseudorandom) number within a predetermined interval. For instance, the backoff time may be based on a pseudorandom integer drawn from a uniform distribution over the interval [0, CW], where CW is an integer within the range of values of the PHY characteristics aCWmin and aCWmax such that aCWmin≤CW≤aCWmax. In an aspect, CW may refer to, or may be referred to as, a contention window size, contention window duration, contention window parameter, or a variant thereof.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
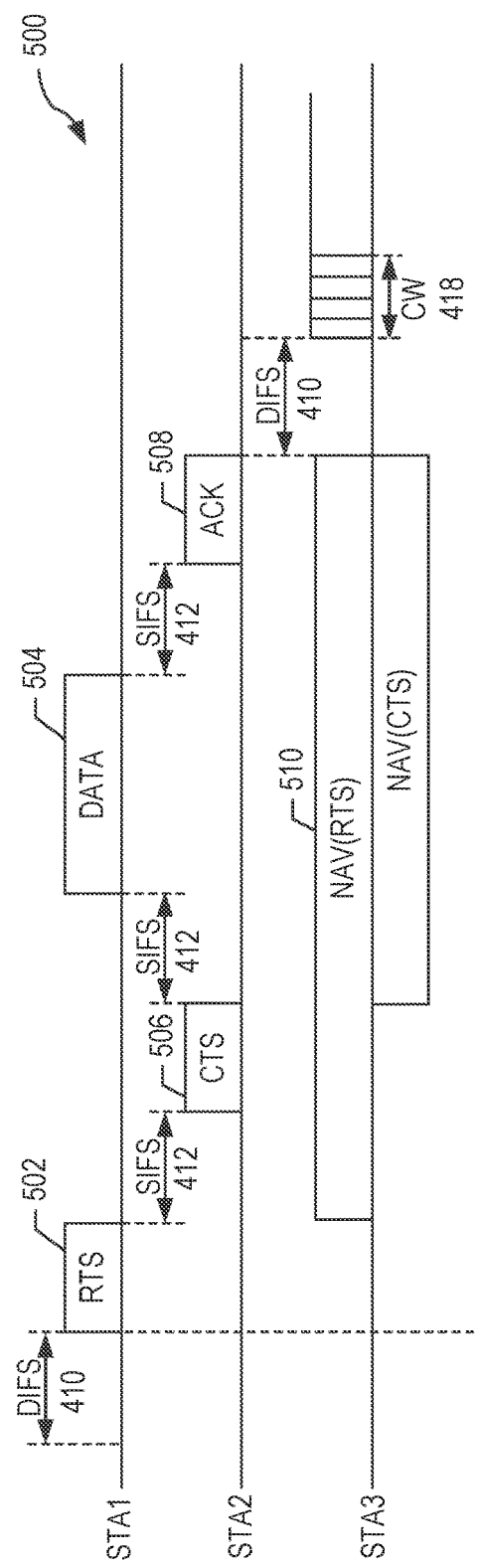
FIG. 5 illustrates an example of a timing diagram of a carrier sense multiple access/collision avoidance (CSMA/CA) based frame transmission procedure for avoiding collision between frames in a channel

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
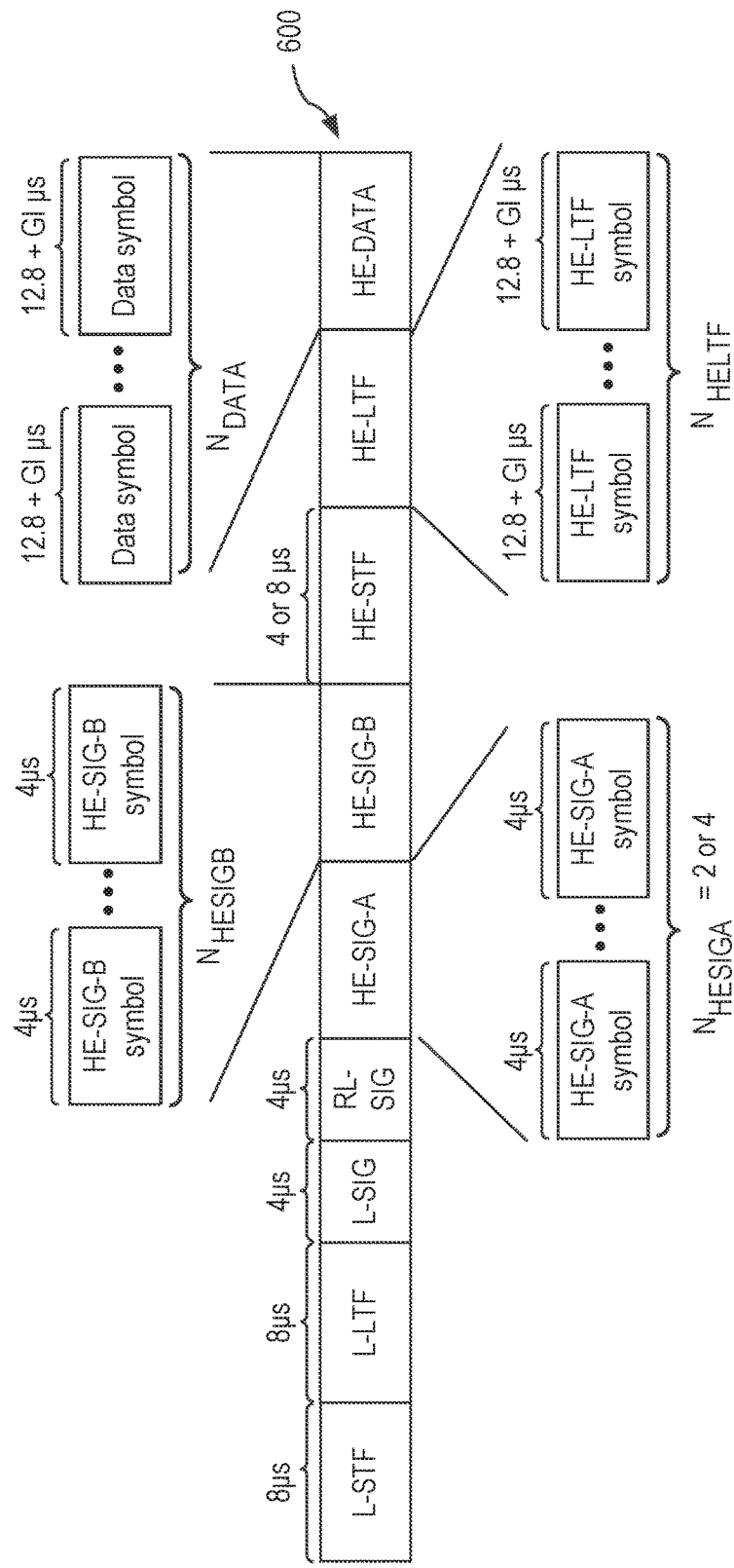
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols. In an aspect, the HE-DATA field may also be referred to as a payload field, data, payload, PSDU, or Media Access Control (MAC) Protocol Data Units (MPDU) (e.g., MAC frame).

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Table 1, shown below, provides examples of characteristics associated with the various components of the HE frame 600.

TABLE 1

| | | | PPDU Frame | | | |
|---|---|---|---|---|---|---|
| Element | Definition | Duration | DFT period | GI | Subcarrier Spacing | Description |
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. |

TABLE 1-continued

| | | | | | | |
|---|---|---|---|---|---|---|
| | | | PPDU Frame | | | |
| Element | Definition | Duration | DFT period | GI | Subcarrier Spacing | Description |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to (156.25 kHz; 4xLTF: 78.125 kHz | The HE-STF of a trigger-based PPDU has a periodicity of 1.6 μs with 5 periods. A trigger-based PPDU is a UL PPDU sent in response to a trigger frame. HE PPDU may support 2xLTF mode and 4xLTF mode. In the 2xLTF mode, HE-LTF symbol excluding GT is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

In one or more implementations, an AP may trigger UL MU transmissions using a trigger frame. In some aspects, the UL MU transmissions may include UL MU-MIMO and/or UL OFDMA triggered by the AP. Triggered stations may transmit MU transmissions as a response to the trigger frame sent by the AP. The trigger frame can contain information about the characteristics of the MU transmission and/or information about the characteristics of the packets to be transmitted by the stations in the corresponding MU transmissions. In some aspects, one of the indicated characteristics in the trigger frame can be the access category, e.g., QoS, of the data packets to be transmitted by the stations. For example, the trigger frame may indicate a primary AC of the data packets in the corresponding MU transmissions. Designation of an AC as a primary AC will be described below, for example, with respect to FIG. 20. In some aspects, a UL MU transmission may include a frame exchange sequence of the following frames: trigger frame, uplink MU frame, and MU acknowledgement (ACK) frame.

Figure 7:
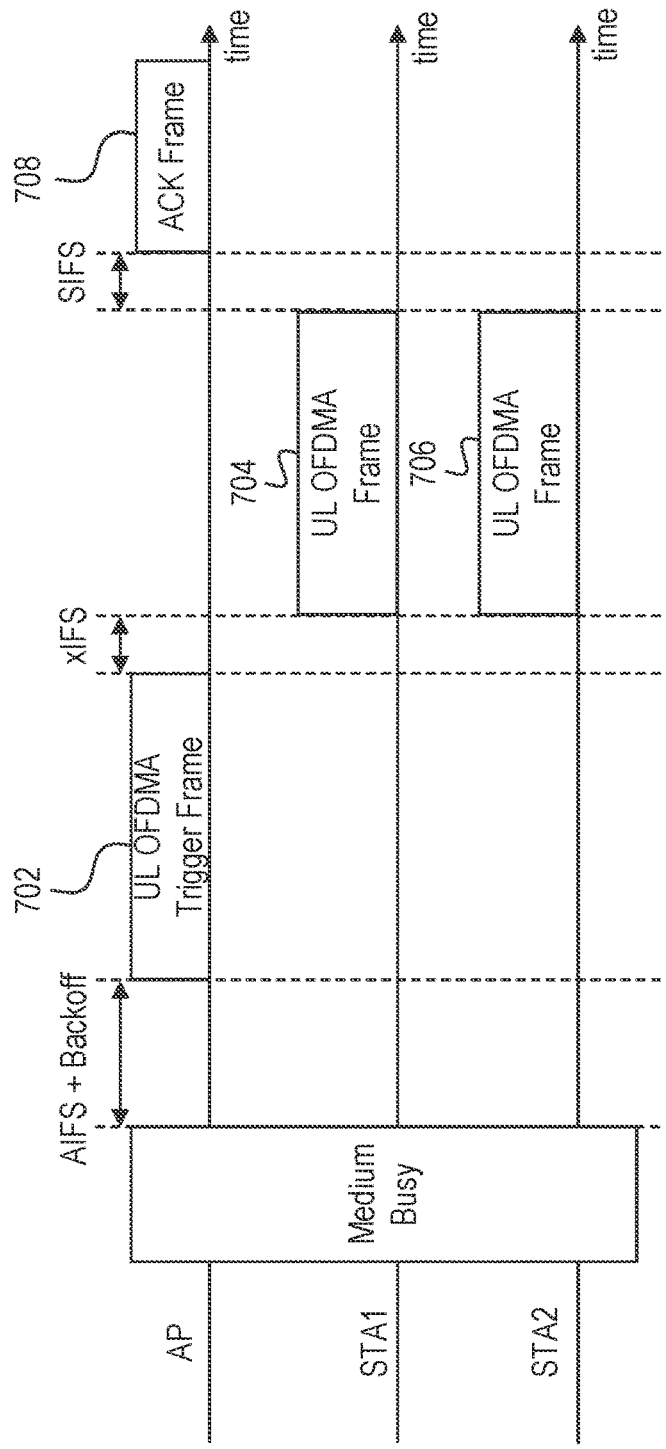
FIGS. 7 through 10 illustrate schematic diagrams of examples of exchanges of frames among wireless communication devices for multi-user (MU) transmission.

FIG. 7 illustrates a schematic diagram of an example of an exchange of frames among wireless communication devices for UL MU transmission. The wireless communication devices may include an AP, STA1, and STA2.

The AP may transmit a trigger frame 702 to STA1 and STA2. In an aspect, the AP may transmit the trigger frame 702 after an AIFS duration and backoff time subsequent to the medium being busy. In this case, the AP may wait for the AIFS duration and the backoff time to elapse prior to transmitting the trigger frame 702. The trigger frame 702 may include resource allocation information for STA1 and STA2. For instance, the resource allocation information may indicate which frequency/spatial resource(s) are allocated to STA1 and STA2 for transmission of uplink frames. In response to the trigger frame 702, STA1 and STA2 may transmit an uplink frame 704 and 706, respectively, to the AP. In this regard, STA1 may transmit the uplink frame 704 based on the resource(s) allocated to STA1, as indicated in the trigger frame 702. Similarly, STA2 may transmit the uplink frame 706 based on the resource(s) allocated to STA2, as indicated in the trigger frame 702. Upon receiving the uplink frames 704 and 706, the AP may transmit an acknowledgement (ACK) frame 708.

In one or more implementations, according to enhanced distributed channel access (EDCA) procedures, a node (e.g., AP, non-AP station) that completes a successful frame exchange can obtain a transmission opportunity (TXOP)

duration and become the TXOP holder. In an aspect, a frame exchange may be considered successful when the frame exchange occurred without collision with another frame (e.g., sent by another station). In an aspect, the successful frame exchange may be denoted as an initial transmission of a TXOP. By way of non-limiting example, a successful frame exchange can be a transmission of a broadcast frame, such as a broadcast control frame (e.g., CTS-to-Self frame) or a broadcast data frame; transmission of a unicast data frame with corresponding ACK frame, and exchange of RTS/CTS frames. In an aspect, a UL MU transmission sequence can be performed when the AP is the TXOP holder or when a non-AP station is the TXOP holder. The TXOP duration may be a time duration in which stations (including APs) have contention free access to the medium. In an aspect, the node that obtained the TXOP duration can transmit data frames with SIFS time interval between frames as long as the frame exchanges are successful.

In some aspects, a station (e.g., non-AP station, AP) may determine (e.g., compute, estimate) a TXOP duration based on its buffer data status. For instance, when the station has more data to send, the TXOP duration may be higher. If the station wins the contention, the TXOP duration may be the TXOP duration determined by the station. In an aspect, an AP may determine a TXOP duration based on buffer data status of non-AP stations served by the AP. In some aspects, the station (e.g., non-AP station, AP) may utilize a maximum TXOP duration allowed by the IEEE 802.11 specification (e.g., rather than determining/computing a TXOP duration based on buffer data status).

Figure 8:
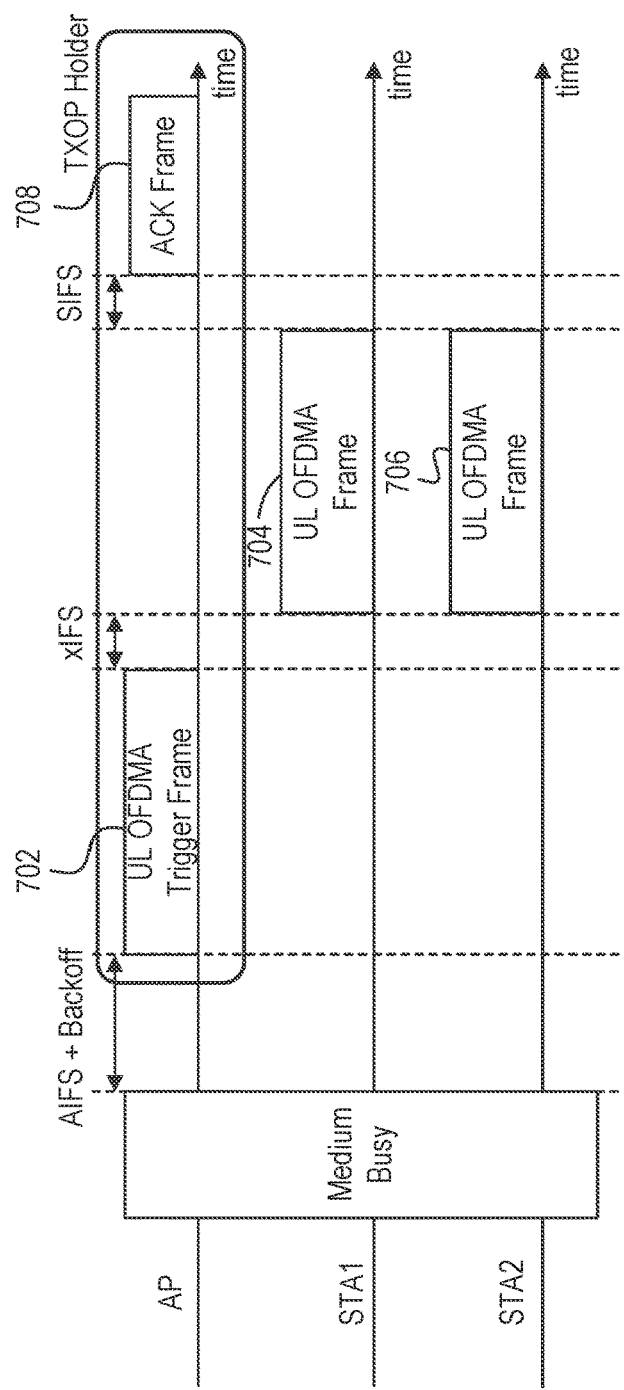

FIG. 8 illustrates a schematic diagram of an example of an exchange of frames among wireless communication devices for UL MU transmission. The description from FIG. 7 generally applies to FIG. 8, with examples of differences between FIG. 7 and FIG. 8 and other description provided herein for purposes of clarity and simplicity.

In FIG. 8, the AP may perform backoff and transmit the trigger frame 702. The AP may win the medium contention through its transmission of the trigger frame 702 and may become the TXOP holder of a UL MU transmission sequence. The UL MU transmission sequence may include the trigger frame 702, the uplink frames 704 and 706, and the acknowledgement frame 708.

Figure 9:
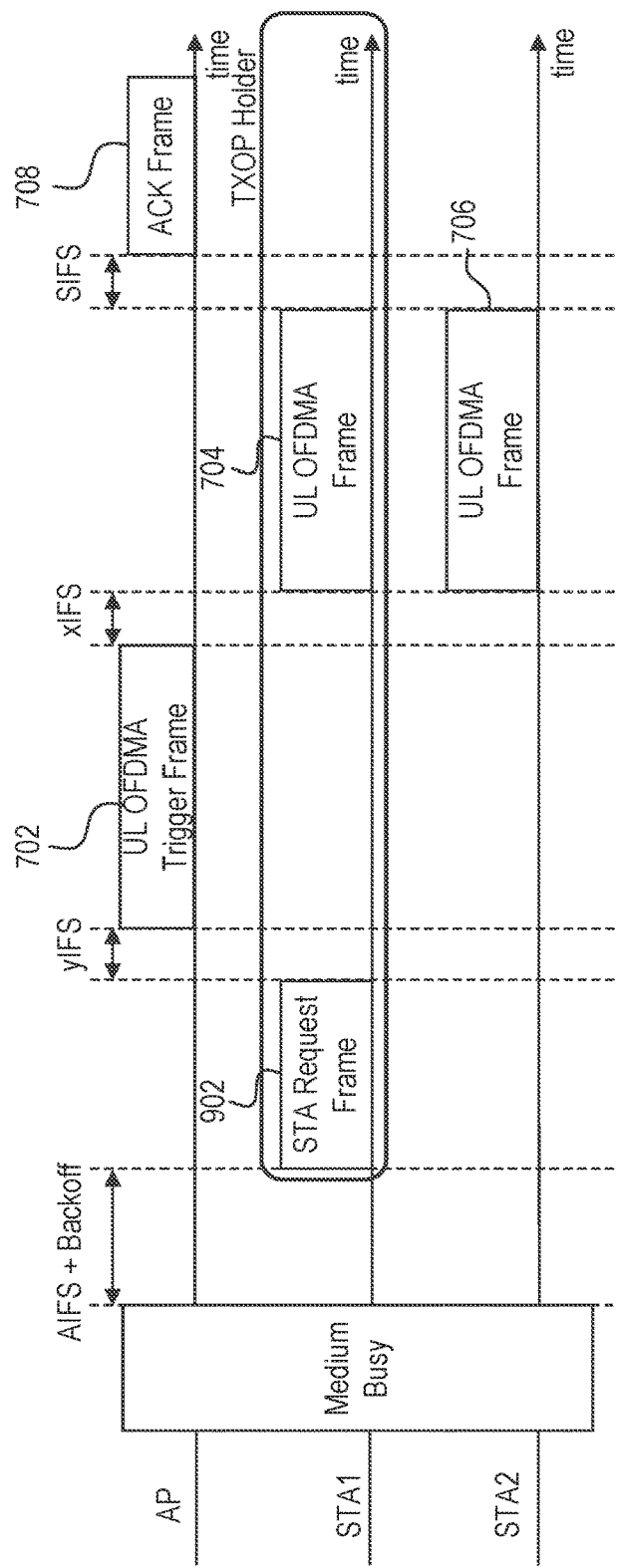

FIG. 9 illustrates a schematic diagram of an example of an exchange of frames among wireless communication devices for UL MU transmission. The description from FIG. 7 generally applies to FIG. 9, with examples of differences between FIG. 7 and FIG. 9 and other description provided herein for purposes of clarity and simplicity.

In FIG. 9, STA1 may perform backoff and transmit a request frame 902. STA1 may win the medium contention through its transmission of the request frame 902 and may become the TXOP holder. In an aspect, STA1 may transmit the request frame 902 to the AP to request that the AP transmit the trigger frame 902. For instance, the request may be a request for the AP to grant/trigger a UL MU transmission.

In one or more implementations, EDCA rules and medium access methods are provided. In some aspects, the EDCA rules and medium access methods may be associated with transmission of a trigger frame for facilitating UL MU transmission when the AP is the TXOP holder.

In some aspects, for downlink data packets, the AP may have four EDCA functions (EDCAFs) that control the backoff procedure for medium access. In an aspect, each EDCAF is associated with an AC and may be utilized to determine, using EDCA, when a frame in a queue with the associated AC is permitted to be transmitted via the medium. Each EDCAF may be associated with a respective backoff time and may decrement the respective backoff time. Upon decrementing the respective backoff time to zero, the EDCAF may allow (e.g., initiate) transmission of the frame containing data (e.g., data packets) of the associated AC. In a case that two or more EDCAFs reach zero at the same time, the EDCAF associated with the higher priority AC may win the contention and allow transmission of the frame. The EDCAF(s) associated with lower priority ACs may increase backoff/contention window size and perform backoff again.

In an aspect, although the transmission of a trigger frame (e.g., 702) is performed by the AP, the trigger frame is not associated with any of the downlink EDCAFs. In an aspect, the trigger frame is not associated with any uplink EDCAF. In an aspect, the trigger frame may be associated an uplink EDCAF (e.g., a virtual uplink EDCAF). An example of such an aspect is described below with respect to FIG. 16.

In one or more implementations, stations may transmit a request frame (e.g., 902) to the AP for facilitating UL MU transmission, including, for instance, UL MU OFDMA transmission and/or UL MU-MIMO transmission. In an aspect, the request frame may include, or may be referred to, as a trigger frame initiation request, a trigger frame initiation request indication, an initiation request, an initiation request frame, an initiation indication, or a variant thereof. In an aspect, the request frame may be referred to as an OFDMA request frame when the request is for UL MU OFDMA transmission. In one or more aspects, the request frame may include one or more of the following signaling: i) station uplink data buffer status of a specific AC; ii) station uplink data buffer status of all ACs; iii) station total uplink data buffer status. In an aspect, the request frame may bind (e.g., limit) uplink transmission to a specific AC.

Figure 10:
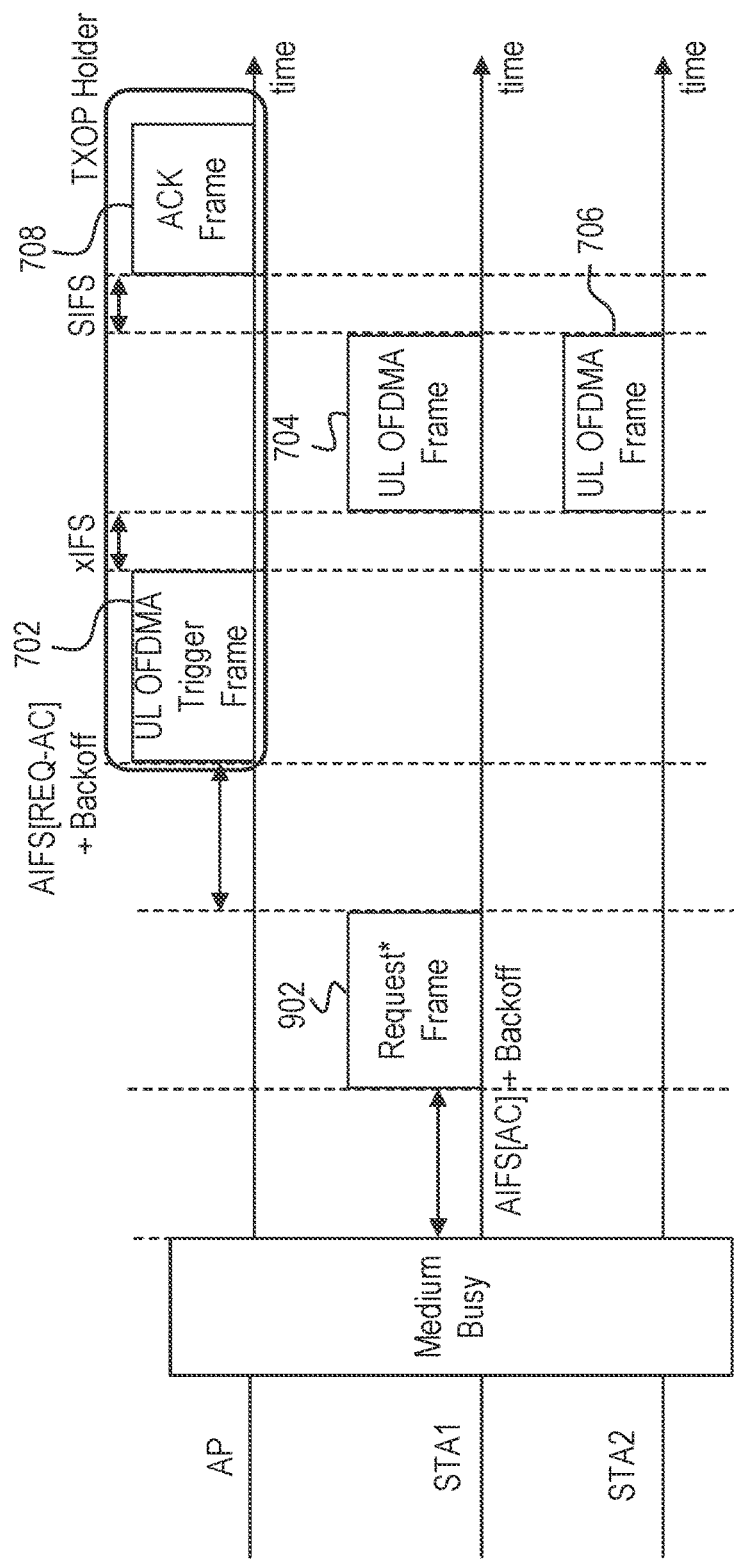

FIG. 10 illustrates a schematic diagram of an example of an exchange of frames among wireless communication devices for UL MU transmission. The description from FIG. 9 generally applies to FIG. 10, with examples of differences between FIG. 9 and FIG. 10 and other description provided herein for purposes of clarity and simplicity.

STA1 may perform backoff and transmit the request frame 902 with specific AC information. In an aspect, the AIFS duration, denoted as AIFS[AC], may be based on the AC information. When the request frame 902 is received by the AP, the AP may perform backoff based on the AC information sent along with (e.g., included in, indicated in) the request frame 902, denoted as REQ-AC. For instance, the AP may perform a backoff procedure using the AC information and/or parameters derived from the AC information indicated by the request frame 902. In this case, the backoff procedure includes the AP waiting for the AIFS[REQ-AC] duration and the backoff time to elapse prior to transmitting the trigger frame 702. In some cases, AC and REQ-AC are the same when the AP correctly determines/decodes the AC information sent along with the request frame 902. In an aspect, as shown in FIG. 10, once the backoff timer for the trigger frame 702 expires, the AP may transmit the trigger frame 702. In another aspect (not shown), the AP may perform medium protection frame exchanges (e.g., RTS/CTS) prior to transmission of the trigger frame 702. In one or more implementations, a trigger frame may be inserted (e.g., virtually inserted) into a downlink EDCA queue. In an aspect, it may be up to AP implementation when to send the trigger frame and/or when the EDCA queue containing the trigger frame is chosen for transmission. This may allow the AP to mix downlink traffic and uplink traffic within a TXOP.

In this regard, the uplink traffic from the stations may be in response to a trigger frame transmitted downlink to the stations. In an aspect, the trigger frame in an EDCA queue associated with an AC may be generated by the AP when the AP receives an uplink OFDMA request frame (e.g., 902) containing information indicative of the AC and/or a buffer status report frame for the AC.

Figure 11:
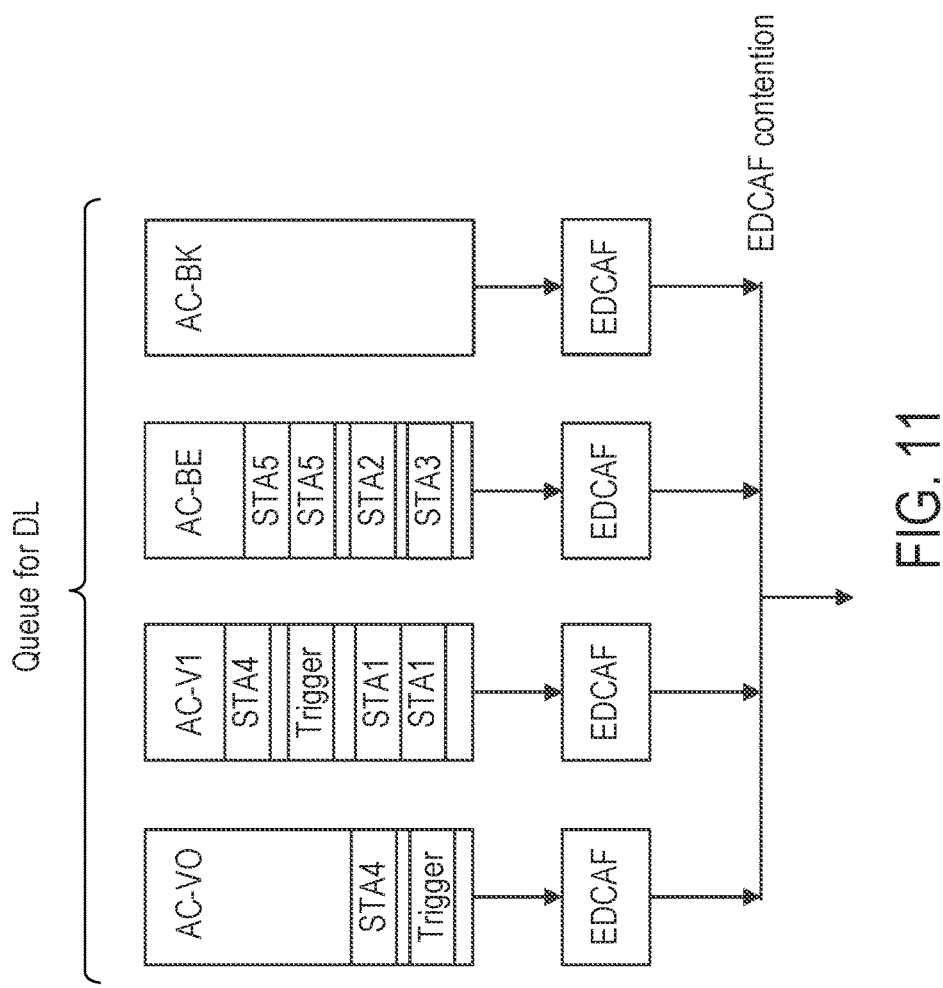
FIG. 11 illustrates an example of an enhanced distributed channel access (EDCA) queue status for downlink queues.

FIG. 11 illustrates an example of an EDCA queue status for downlink queues. In FIG. 11, the EDCA queue status indicates that AC-VO, AC-VI, and AC-BE downlink transmissions are pending (e.g., queues are non-empty), whereas no downlink transmission is pending for AC-BK (e.g., AC-BK queue is empty). Thus, the downlink queues may be referred to as downlink transmit queues or simply transmit queues. The EDCA queue status also depicts an intended recipient of the data packets stored in the EDCA queues. For instance, the AC-VI queue is currently storing data packets associated with AC-VI to be transmitted to STA1 and STA4. In an aspect, an EDCAF that is associated with a non-empty queue may perform a backoff timer count down and contend for medium access.

In some aspects, trigger frames may be inserted (e.g., embedded) in a downlink EDCA queue. By inserting the trigger frame into a downlink EDCA queue, the request frame does not necessarily cause the AP to perform backoff separately from other existing downlink EDCA queues. The backoff timer for existing EDCAFs may be used to send the trigger frame. Furthermore, multiplexing of transmission of trigger frame and downlink packets is possible. In an aspect, the primary AC of the data packets in the UL MU transmission may be the same as the AC that has won the TXOP and medium contention.

In an aspect, the trigger frames inserted the downlink EDCA queues are not physically stored in the downlink EDCA queues. In this regard, the trigger frames may be utilized as placeholders (e.g., virtual frames) in the downlink EDCA queues of the various ACs, such that when an associated EDCAF wins the contention, the AP may determine whether to transmit a downlink frame stored in the associated queue or generate (e.g., on-the-fly) and transmit a trigger frame. The generated and transmitted trigger frame may indicate the AC associated with the downlink EDCA queue in which the trigger frame is inserted (e.g., virtually inserted) as the primary AC.

The TXOP of the downlink EDCA is shared with uplink transmission by the stations, as the trigger frame may be considered (e.g., treated) as one of the downlink frames and the uplink OFDMA transmission by the stations may be treated as an acknowledgement response to the trigger frame.

Figure 12:
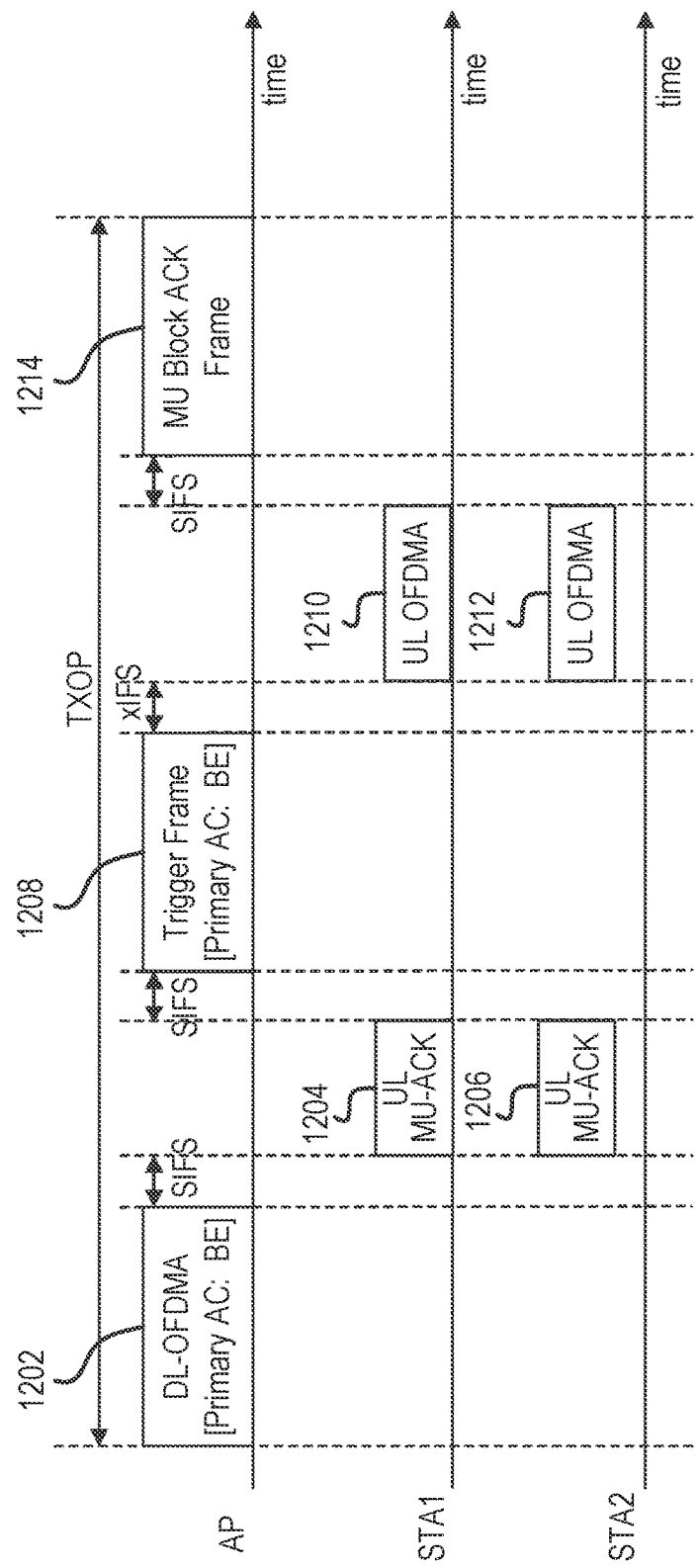
FIG. 12 illustrates a schematic diagram of an example of an exchange of frames among wireless communication devices for MU transmission.

FIG. 12 illustrates a schematic diagram of an example of an exchange of frames among wireless communication devices for UL MU transmission. The exchange of frames may include multiplexing of downlink frames and trigger frames. Within the AP, EDCA with AC-BE may have won medium contention, and the AP may transmit downlink packets with AC-BE.

As shown in FIG. 12, since AC-BE won the medium contention within the AP, the AP may transmit a downlink OFDMA frame 1202 to STA1 and STA2, where the downlink OFDMA frame 1202 may include data associated with AC-BE data. For instance, BE data may be contained in the HE-DATA field of the downlink OFDMA frame 1202. In this regard, the downlink OFDMA frame 1202 may include respective AC-BE data associated with each of STA1 and STA2. The AP may win medium contention external to the AP through its successful transmission of the downlink OFDMA frame 1202. In an aspect, the AP may transmit the respective data associated with each of STA1 and STA2 in respective resources (e.g., frequency subband(s)) allocated to STA1 and STA2. STA1 and STA2 may transmit a respective acknowledgement frame 1204 and 1206, respectively, to the AP upon receipt of the DL OFDMA frame 1202 by STA1 and STA2.

After reception of the acknowledgement frames 1204 and 1206, the AP may transmit a trigger frame 1208 to STA1 and STA2. Since the AP won the contention based on its successful transmission of the downlink OFDMA frame 1202, which is associated with (e.g., contains) AC-BE data, the trigger frame 1208 indicates the primary AC to be AC-BE. In an aspect, the trigger frame 1208 may be the trigger frame 702 in FIG. 7. The trigger frame 1208 may include resource allocation information for UL MU transmission by STA1 and STA2 in response to the trigger frame 1208. In response to the trigger frame 1208, STA1 and STA2 may transmit UL OFDMA frames 1210 and 1212, respectively, to the AP based on the resource allocation information in the trigger frame 1208. The AP may transmit an acknowledgement frame 1214 (e.g., MU block acknowledgement frame) to STA1 and STA2 in response to the UL OFDMA frames 1210 and 1212. In an aspect, the primary AC is the same between the DL OFDMA frame 1202, trigger frame 1208, and UL OFDMA frames 1210 and 1212.

In one or more implementations, virtual EDCA queues may be utilized for facilitating UL MU transmission. The virtual EDCA queues may include trigger frames for facilitating UL MU transmission, and, thus, may be referred to as uplink EDCA queues. In an aspect, each of the virtual EDCA queues may correspond to a downlink EDCA AC. The AP may perform backoff for all eight EDCAF (e.g., four for downlink and four for uplink). The uplink MU virtual EDCAF may be considered (e.g., treated) as another downlink EDCAF. In an aspect, a trigger frame is placed into a virtual EDCA queue for uplink when the AP is aware of an uplink queue for that AC (e.g., based on buffer status information from one or more stations).

Figure 13:
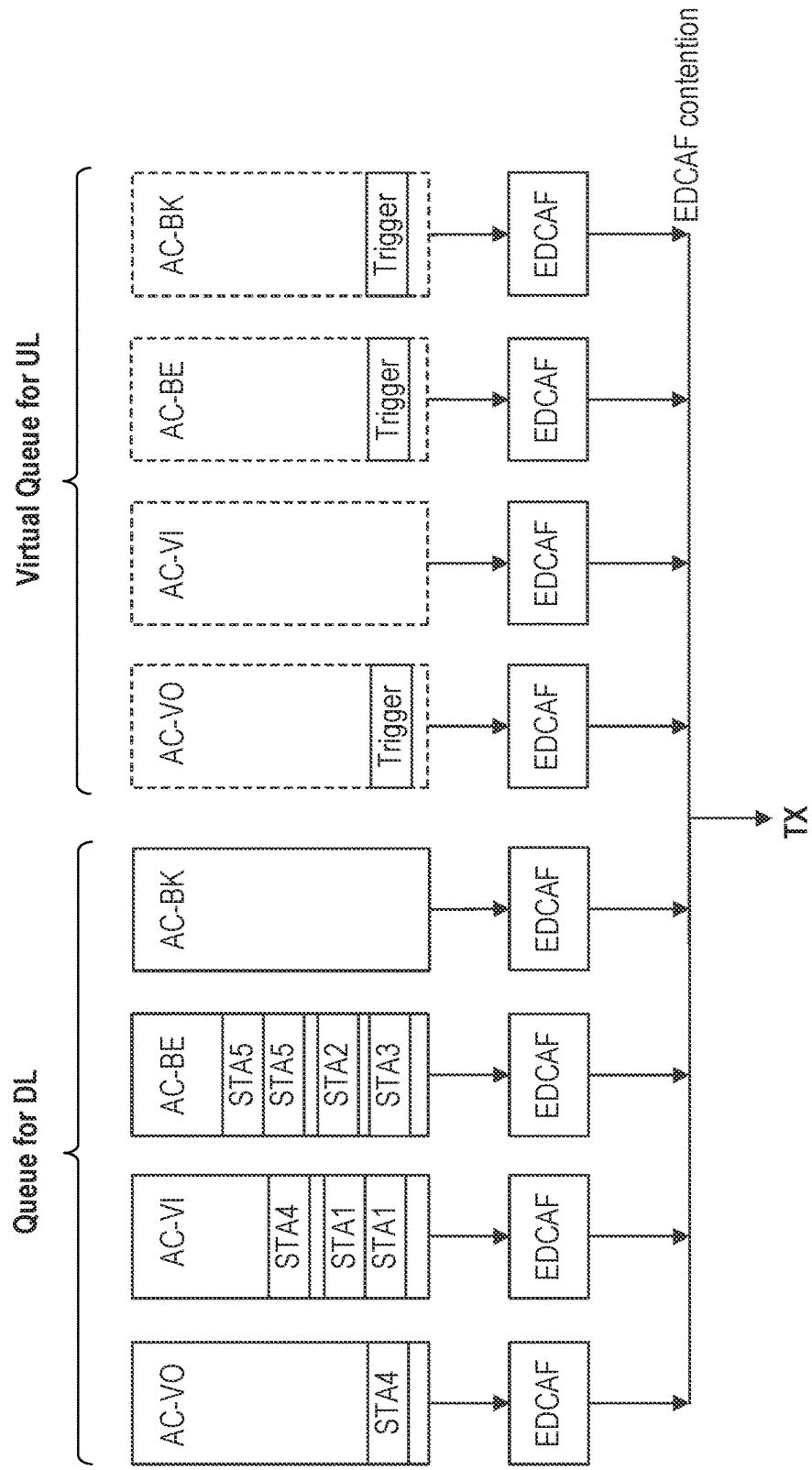
FIG. 13 illustrates an example of an EDCA queue status.

FIG. 13 illustrates an example of an EDCA queue status for downlink queues and virtual uplink queues. In FIG. 13, the EDCA queue status indicates that AC-VO, AC-VI, and AC-BE downlink transmissions are pending and AC-VO, AC-BE, and AC-BK uplink transmissions are pending, whereas no downlink transmission is pending for AC-BK and no uplink transmission is pending for AC-VI. In this regard, the virtual uplink queues for AC-VO, AC-BE, and AC-BK may each include a trigger frame (e.g., a virtual trigger frame) to indicate that uplink transmissions from one or more stations are pending (e.g., based on buffer status information of the station(s)). Thus, the downlink queues and virtual uplink queues may be referred to as transmit queues. In an aspect, each EDCAF that is associated with a non-empty queue (for both downlink and uplink queues) may perform a backoff timer count down and contend for medium access.

In an aspect, since the uplink transmission (e.g., the trigger frame for facilitating uplink transmission) may be implemented with virtual EDCA queues, internal collisions may occur between an EDCAF associated with a downlink EDCA queue and an EDCAF associated with an uplink EDCA queue. For instance, an EDCAF collision may occur between DL and UL EDCAs associated with the same or different priorities.

Figure 14:
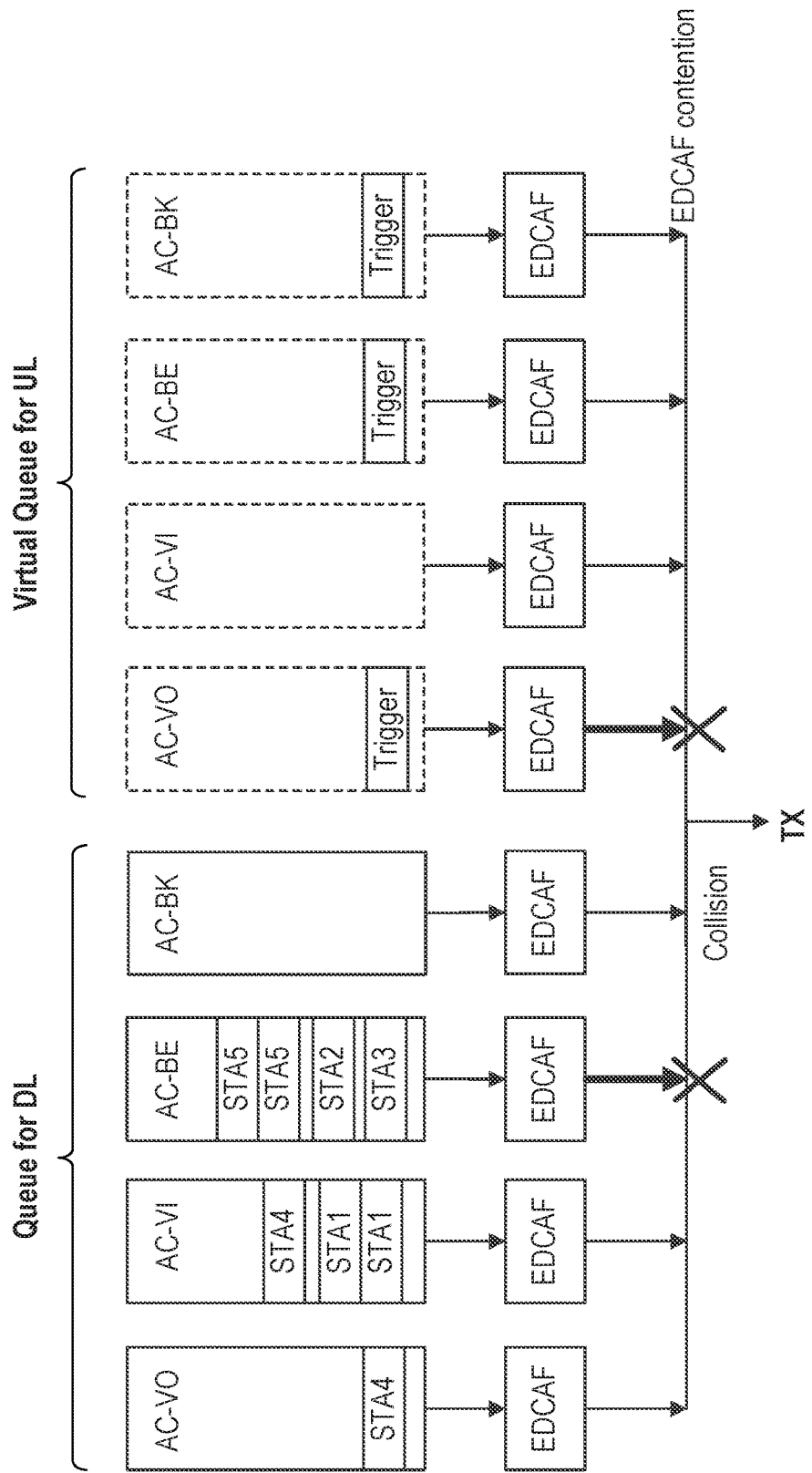
FIGS. 14 and 15 illustrate examples of internal collisions associated with the EDCA queue status of FIG. 13.

FIG. 14 illustrates an example of an internal collision associated with the EDCA queue status of FIG. 13. In FIG. 14, an EDCAF collision may occur between DL AC-BE and UL AC-VO, which are associated with different priorities. In an aspect, different priorities can be associated with (e.g., implemented by using) different contention window size (e.g., different default contention window size), and/or different amount of contention window size increase in the event of a medium collision. In an EDCAF collision such as that shown in FIG. 14, an action (e.g., option) performed by the AP in response to the EDCAF collision may be based on AP implementation. In an aspect, by way of non-limiting example, the AP may allow/implement one of the following options:

Option 1) DL EDCAF always wins (e.g., regardless of uplink AC priority) and UL EDCAF goes into internal collision (e.g., increases backoff/contention window size and performs backoff again). Alternatively, the reverse is also possible, where UL EDCAF always wins and DL EDCAF goes into internal collision.

Option 2) EDCAF (whether UL or DL) with higher priority wins.

With regard to FIG. 14, in Option 2, since AC-VO is associated with higher priority than AC-BE, the UL AC-VO wins and the DL AC-BE goes into internal collision.

Figure 15:
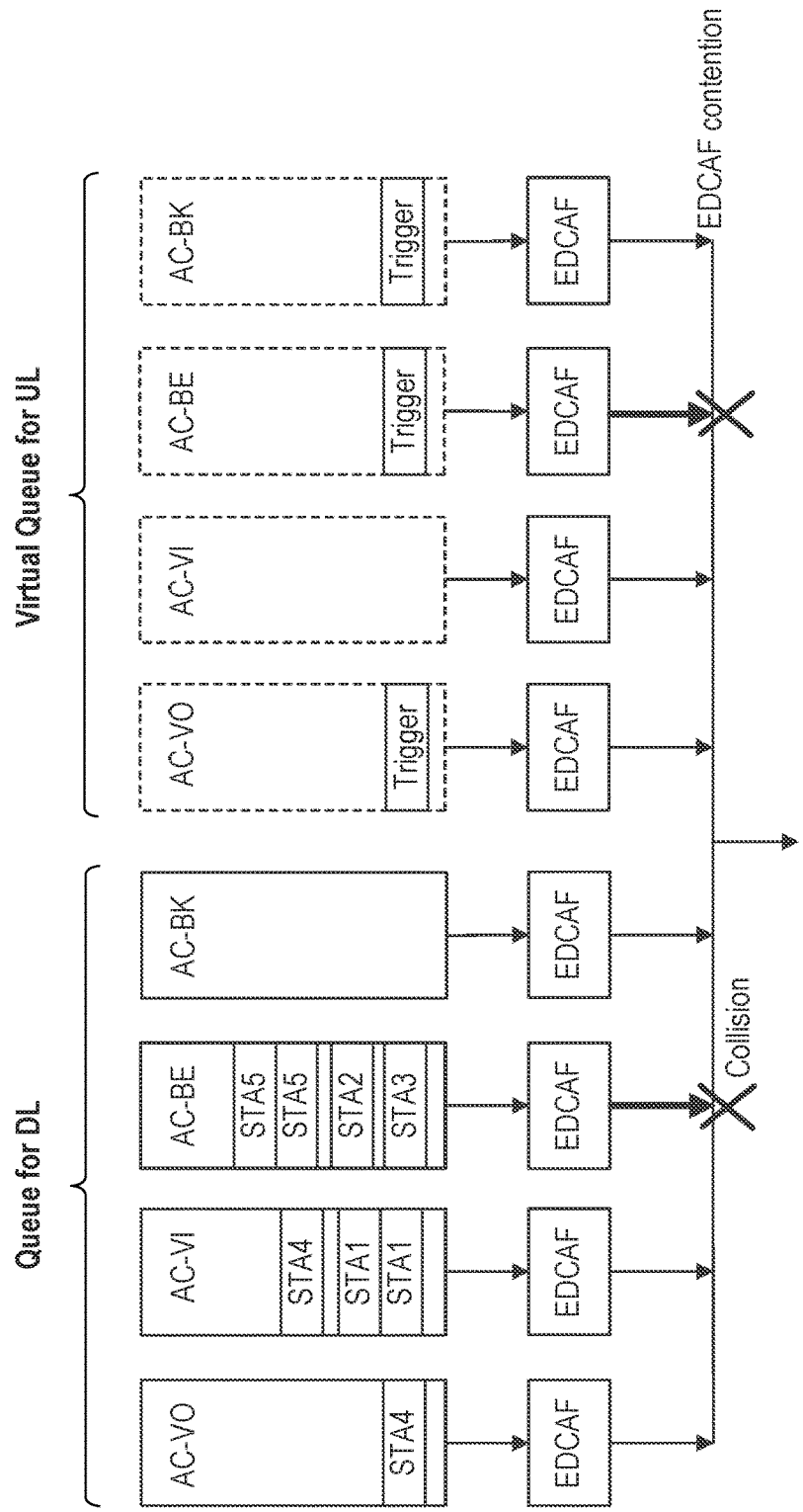

FIG. 15 illustrates another example of an internal collision associated with the EDCA queue status of FIG. 13. In FIG. 15, an EDCAF collision may occur between DL and UL EDCA associated with the same priority, e.g., DL AC-BE and UL AC-BE. In such a case, an action (e.g., option) performed by the AP in response to the EDCAF collision may be based on AP implementation. In an aspect, by way of non-limiting example, the AP may allow/implement one of the following options:

Option 1) DL EDCAF always wins in the case that the DL EDCAF collides with a UL EDACF associated with same priority, and UL EDCAF goes into internal collision. Alternatively, the reverse is also possible, where UL EDCAF wins the contention and DL EDCAF goes into internal collision.

Option 2) Both DL and UL EDCAF go into internal collision and increase backoff window.

In one or more implementations, the number of virtual EDCA queues for uplink may be different from the number of EDCA queues for downlink. In some aspects, one virtual EDCA may be utilized for UL MU transmission such that any UL MU transmission requests (e.g., requests associated with any AC) are mapped to the uplink virtual EDCA. In these aspects, four EDCAFs may be utilized for downlink and one virtual EDCAF may be utilized for uplink. In effect, the VO, VI, BE, and BK downlink EDCAFs and the uplink EDCAF share the TXOP. The uplink OFDMA EDCAF may be considered (e.g., treated) as another downlink EDCAF. The trigger frame may be put into a virtual queue for uplink to facilitate UL MU transmission.

Figure 16:
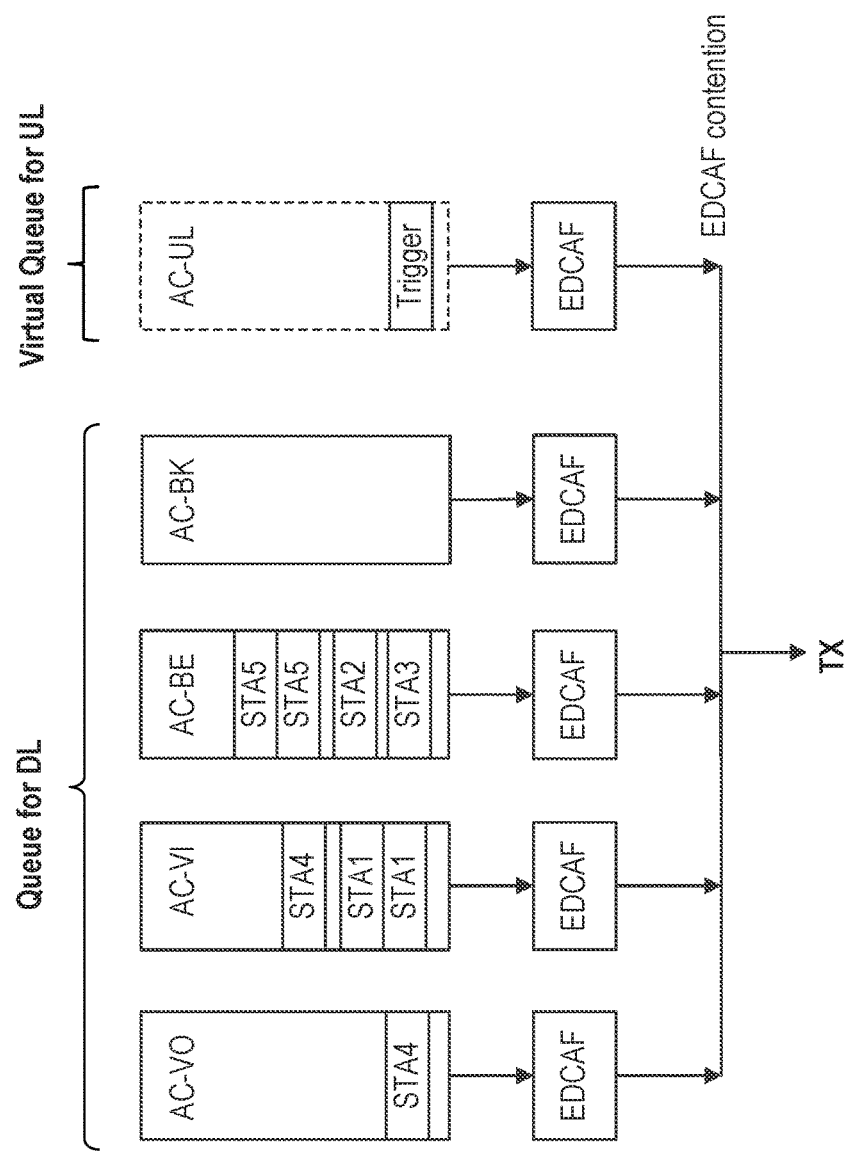
FIG. 16 illustrates an example of an EDCA queue status.

FIG. 16 illustrates an example of an EDCA queue status for downlink queues and a virtual uplink queue. The EDCA queue status indicates that AC-VO, AC-VI, and AC-BE downlink transmissions are pending and an uplink transmission is pending, whereas no downlink transmission is pending for AC-BK. In FIG. 16, the different ACs (e.g., VO, VI, BE, BK) of uplink data transmission may be combined as one single UL MU transmission and denoted as AC-UL. Internal collisions within the AP may occur between the uplink EDCAF and one of the downlink EDCAFs.

Figure 17:
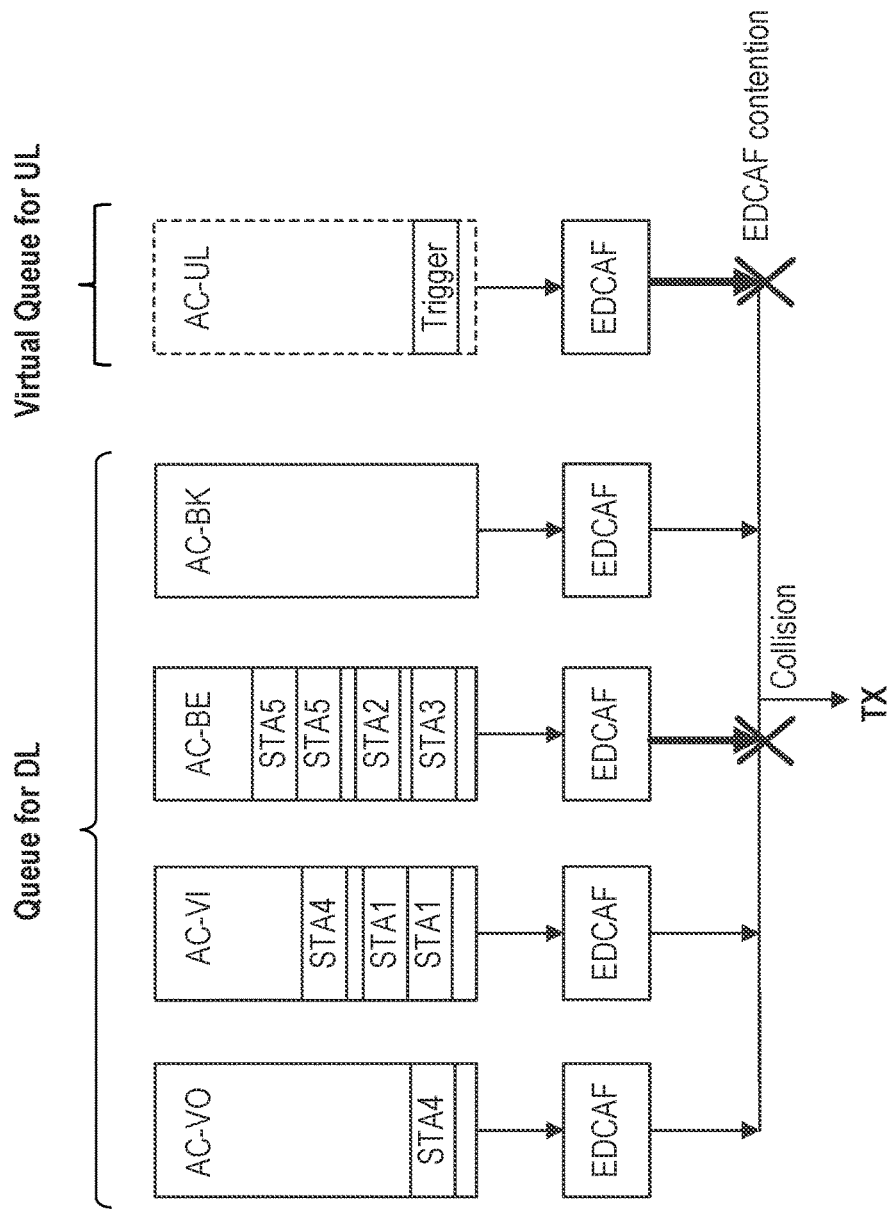
FIG. 17 illustrates an example of an internal collision associated with the EDCA queue status of FIG. 16.

FIG. 17 illustrates an example of an internal collision associated with the EDCA queue status of FIG. 16. In FIG. 17, an internal collision occurs between a downlink EDCAF (e.g., EDCAF for DL AC-BE) and the uplink EDCAF. In such a case, an action (e.g., option) performed by the AP in response to the EDCAF collision may be based on the AP's implementation. In an aspect, by way of non-limiting example, the AP may allow/implement one of the following options:

Option 1) The AP may announce (or internally configure) the priority of the uplink EDCAF. Depending on the priority, either one of the downlink EDCAF (e.g., EDCAF for DL AC-BE in FIG. 16) or the uplink EDCAF may win the contention, while the losing EDCAF performs contention window increase and backoff. In an aspect, the priority of the EDCAF may be set in a design specification or a standard specification (e.g., IEEE 802.11 ax standard specification). For example, the uplink EDCAF may have a lower priority than all the downlink EDCAFs. As another example, the uplink EDCAF may have a lower priority than the downlink AC-BE but a higher priority than the downlink AC-BK, etc. Other relative priorities between the uplink EDCAF and each of the downlink EDCAF may be utilized.

Option 2) In the event of a collision, the trigger frame can be sent along with downlink frames from the AC associated with the collision (e.g., downlink frames from the AC that has collided), without any internal collision. In a first example, a trigger frame and one or more of the downlink frames may be transmitted in one PPDU. The trigger frame and one or more downlink frames may be frequency and/or spatially multiplexed in a multi-user PPDU. In a second example, a trigger frame and one or more of the downlink frames may be transmitted using multiple PPDUs. In a third example, a trigger frame may be transmitted in one PPDU, and one or more of the downlink frames may be transmitted in one or more other PPDUs. When multiple PPDUs are utilized for the trigger frame and the downlink frames, such multiple PPDUs may share a TXOP. In an aspect, the primary AC of the uplink MU transmissions is limited to the AC of the downlink frames. The choice of the primary AC for uplink OFDMA may depend on the AC of the downlink EDCAF associated with the collision (e.g., the AC of the collided downlink EDCAF).

With reference to FIG. 17, in Option 2, the trigger frame can be sent along with downlink frames from AC-BE without any internal collision. The order in which to send the frames (e.g., the trigger frame before or after the downlink frame(s)) may be based on the AP's implementation. In an aspect, the primary AC of the uplink MU transmissions may be limited to AC-BE.

FIGS. 14, 15, and 17 illustrate examples of internal EDCAF collisions that may occur for the EDCA queue status of FIG. 13 (for FIGS. 14 and 15) and 16 (for FIG. 17) and examples of associated options for resolving the internal collisions. Other internal EDCAF collisions may occur in the EDCA queue status of FIGS. 13 and 16 and/or other associated options may be utilized by the AP to resolve the EDCAF collisions.

In one or more aspects, a downlink queue (e.g., queue for DL in FIGS. 11 and 13 through 17) may be one or more memories (e.g., 240 in FIG. 2), which may be registers. In one or more aspects, a virtual uplink queue (e.g., virtual queue for UL in FIGS. 13 through 17) is not an actual, physical memory. In one aspect, a virtual uplink queue is virtual and is used to illustrate an AP's action with respect to a trigger frame that can facilitate uplink transmission by one or more stations. In one aspect, the AP generates a trigger frame on-the-fly and does not store the trigger frame in an actual, physical memory.

In one or more implementations, EDCA rules and medium access methods associated with transmission of a trigger frame for facilitating UT. MU transmission when the STA is the TXOP holder are provided.

Figure 18:
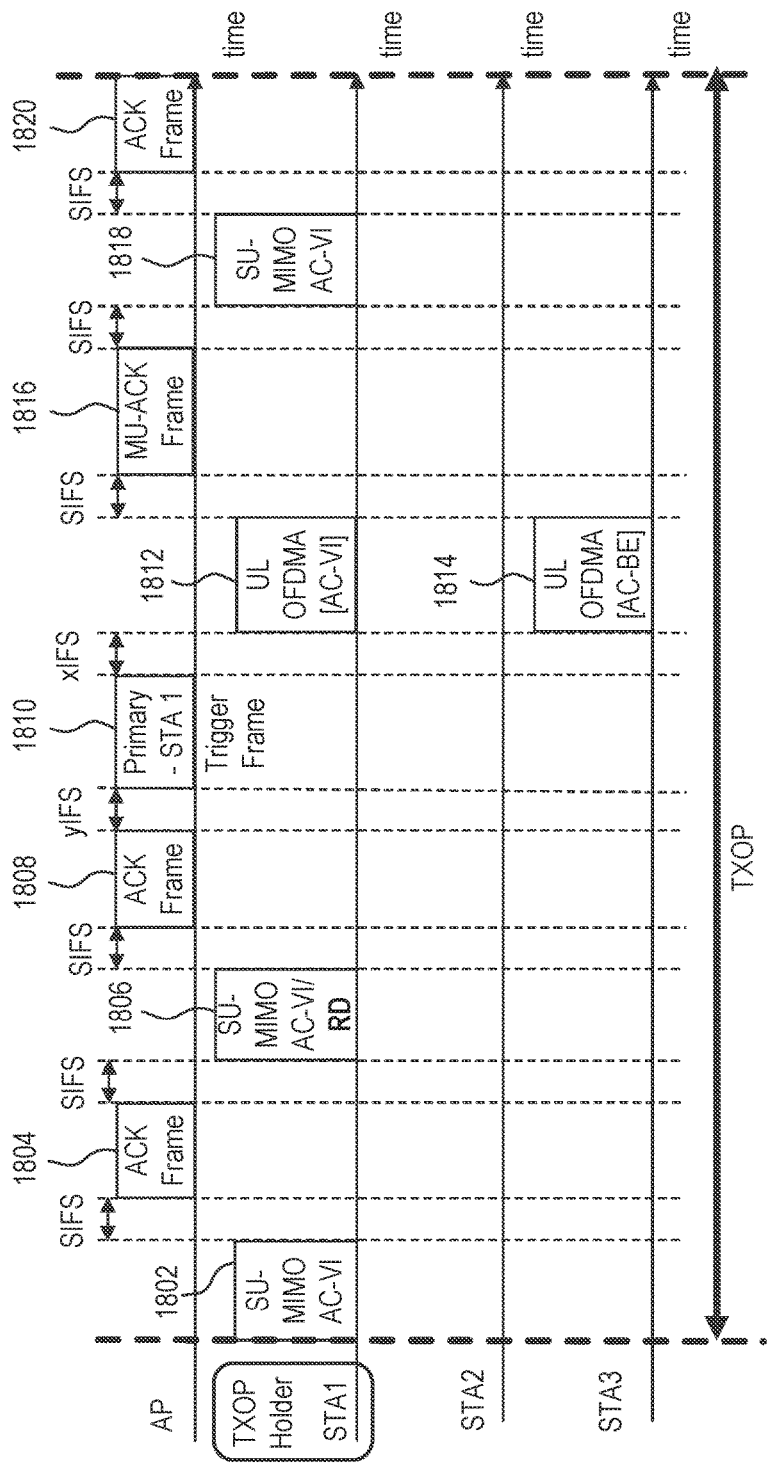
FIG. 18 illustrates a schematic diagram of an example of an exchange of frames among wireless communication devices when a station is a transmission opportunity (TXOP) holder.

FIG. 18 illustrates a schematic diagram of an example of an exchange of frames among wireless communication devices when a station STA1 (e.g., non-AP station) is the TXOP holder. STA1 may transmit an uplink frame 1802 to the AP. STA1 may win the contention and become the TXOP holder based on its successful transmission of the uplink frame 1802. The uplink frame 1802 may include AC-VI data. The uplink frame 1802 may be transmitted in an SU-MIMO manner and may be referred to as an SU-MIMO frame. The AP may transmit an acknowledgement frame 1804 upon receipt of the uplink frame 1802.

STA1 may transmit an uplink frame 1806 to the AP that includes STA1's indication, depicted as RD (or reverse direction) in FIG. 18, to allow transmission of a UL MU transmission sequence within STA1's TXOP duration. The indication may allow/cause the AP to transmit a trigger frame for facilitating UL MU transmission. For instance, the indication may be utilized to indicate to the AP that the AP can try to schedule UL OFDMA.

The AP may transmit an acknowledgement frame 1808 to STA1 upon receipt of the uplink frame 1806. The acknowledgement frame 1808 may include a confirmation to STA1 that the AP will transmit a trigger frame (e.g., after an interframe spacing (IFS) time denoted as yIFS). In an aspect, the AP may transmit the acknowledgement frame 1808 after a yIFS (e.g., SIFS, PIFS) time.

The AP may transmit a trigger frame 1810 to facilitate UL MU transmission. In an aspect, the trigger frame 1810 may indicate that STA1 is a primary station and/or that AC-VI is a primary access category. STA1 and STA3 may transmit uplink frames 1812 and 1814, respectively. The uplink frames 1812 and 1814 may be transmitted (e.g., transmitted simultaneously) in accordance with resource allocation information contained in the trigger frame 1810. For instance, the uplink frames 1812 and 1814 may be referred to as uplink OFDMA frames when they are transmitted in an OFDMA manner. The AP may transmit an acknowledgement frame 1816 (e.g., MU acknowledgement frame, block acknowledgement frame) upon receipt of the uplink frames 1812 and 1814.

After a complete sequence of UL MU transmission, which may include the trigger frame 1810, uplink frames 1812 and 1814, and acknowledgement frame 1816, STA1 may take back the medium and continue with its transmission(s) until an end of the TXOP duration. In FIG. 18, after the complete sequence of UL MU transmission, STA1 may transmit an uplink frame 1818 (e.g., SU-MIMO frame) to the AP. The AP may transmit an acknowledgement frame 1820 to STA1 upon receipt of the uplink frame 1818.

In an aspect, in a case that the AP needs to transmit multiple UL MU transmission sequences (e.g., transmit multiple trigger frames), the AP shall indicate continuation of the UL MU transmission in at least one of the frames within the UL MU transmission sequence. For example, the acknowledgement frame 1816 corresponding to the UL MU transmission may contain an indication of a continued uplink MU transmission sequence after the acknowledgement frame 1816. In this case, the AP may transmit a trigger frame (not shown) at a time interval (e.g., SIFS) after transmission of the acknowledgement frame 1816.

In some aspects, STA1 may perform TXOP sharing or TXOP transfer when allowing UL MU transmission within its TXOP duration. In TXOP transfer, the ownership of the TXOP is conveyed/transferred from STA1 to the AP for the remainder of the TXOP duration.

With reference back to FIG. 18, FIG. 18 illustrates an example of TXOP sharing. In the example, STA1's indication, depicted as RD indication, may be, or may include, a TXOP sharing indication by STA1. In an aspect, the TXOP sharing may allow the AP to initiate a single UL MU transmission. The single UL MU transmission may include transmission of a single trigger frame by the AP to the station(s), transmission of uplink frames in response to the trigger frame by the station(s) to the AP, and transmission of an acknowledgement frame by the AP to the station(s).

In an aspect, STA1 may include an indication of a duration of the TXOP sharing (e.g., a duration of time during which STA1 relinquishes ownership of the TXOP to the AP). In an aspect, the AP may request to retain the TXOP for one or more additional UL MU transmissions by transmitting to STA1 an indication of a request for a continued uplink MU transmission sequence (e.g., in an acknowledgement frame). In an aspect, along with the indication, the AC of the TXOP, duration allowed for UL MU transmission, and/or an allowed AC from other stations may be indicated. The duration allowed for UL MU transmission may be smaller than a TXOP limit set by STA1/AP.

In one or more implementations, to facilitate UL MU transmission operations, a trigger frame (e.g., 1810) may include an indication of a primary AC and/or a primary user. In an aspect, the indication of the primary user may be an implicit notion of the primary user rather than an explicit indication contained in the trigger frame. In an aspect, the primary user may be referred to as a primary station. In an aspect, the AP has the queue status for different ACs for each station. In an aspect, the AP may designate the primary access category based at least on the queue status for the different ACs for each station.

In some aspects, primary AC operations may be performed when the trigger frame includes a primary AC indication. For primary AC operations, in one aspect, all stations participating in UL MU transmissions may be treated as equal and in the same virtual uplink queue when determining the TXOP duration. The AP may impose restrictions on which data packets can be sent in the UL MU transmission process/sequence based on the primary AC. For example, the AP may impose that stations transmit data only from the primary AC unless some conditions are satisfied. An example of a condition may be that the primary AC is associated with an empty queue for a given station. When such a condition is satisfied, the AP may allow the station to transmit data associated with other ACs.

In some aspects, primary user operations may be performed when the trigger frame includes a primary user indication. For primary user operations, a specific station is determined to be a primary source of determination of the TXOP duration. In an aspect, for primary user operations, the TXOP duration may be determined based on a specific user together with a specific AC. In this context, the specific user and the specific AC may be referred to as the primary user and the primary AC, respectively. If the AP determines the TXOP duration for primary user operations, the AP may compute the TXOP duration based on the data queue of the primary user. In an aspect, in a case where a primary AC is specified, the TXOP duration may be based on the data queue of the primary AC of the primary user. In some aspects, the AP may utilize a maximum TXOP duration allowed by the IEEE 802.11 specification (e.g., rather than determining/computing a TXOP duration based on data queue information).

Figure 19:
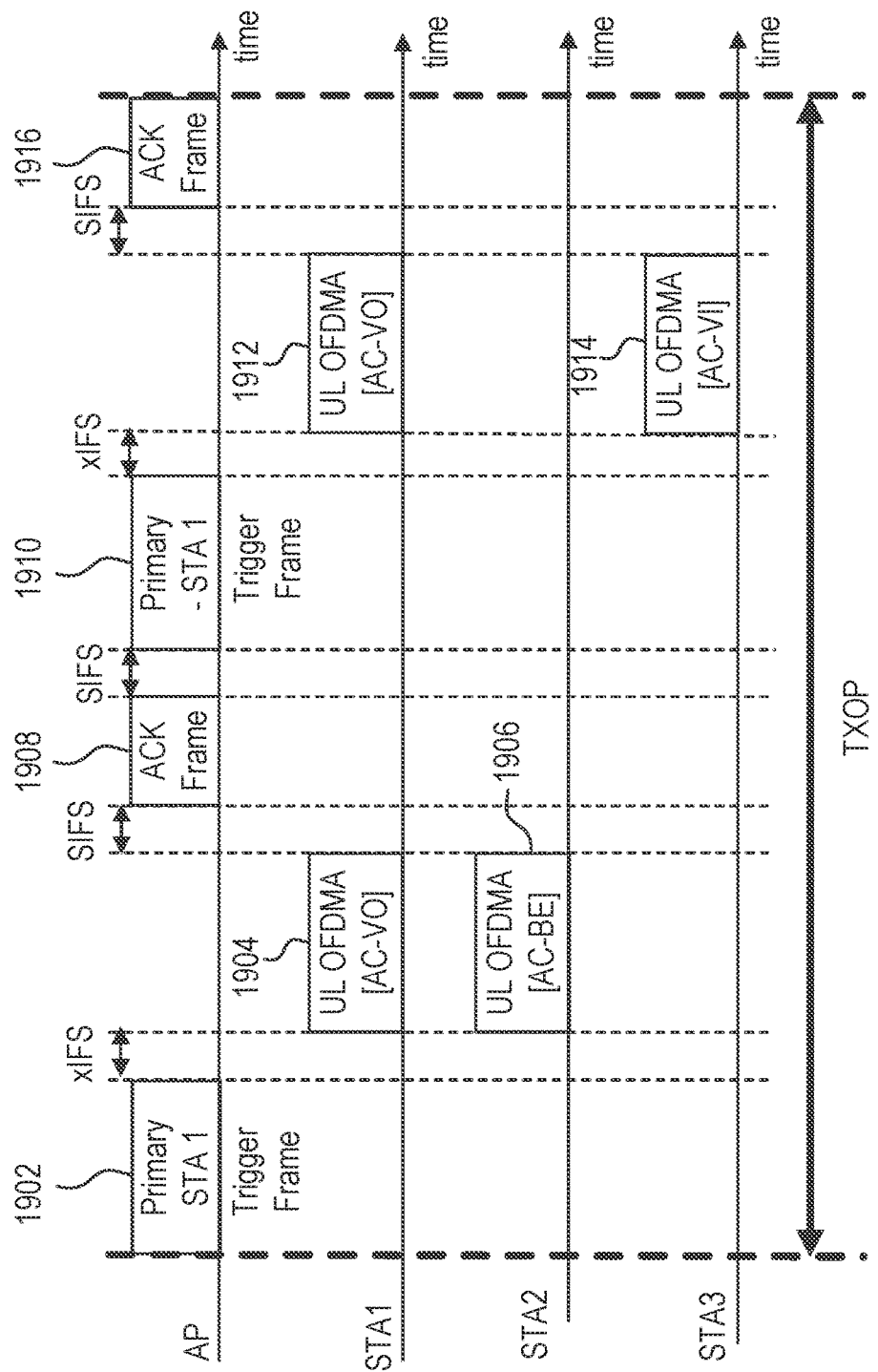
FIG. 19 illustrates a schematic diagram of an example of an exchange of frames among wireless communication devices for MU transmission in a primary user operation mode.

FIG. 19 illustrates a schematic diagram of an example of an exchange of frames among wireless communication devices for UL MU transmission in a primary user operation mode. As an example, in FIG. 19, STA1 is chosen to be (e.g., designated as) the primary user and AC-VO from STA1 is the reference for the determination of the TXOP duration. During this TXOP, AC-VO frame(s) for STA1 should be scheduled in all UL MU transmission(s).

The AP may trigger MU transmission by transmitting a trigger frame 1902. In an aspect, the trigger frame 1902 may be the trigger frame 1810 of FIG. 18. The trigger frame 1902 may indicate AC-VO as the primary AC and STA1 as the primary station. STA1 and STA2 may respond to the trigger frame 1902 by sending uplink frames 1904 and 1906, respectively. The AP may transmit an acknowledgement frame 1908 upon receipt of the uplink frames 1904 and 1906. The AP may transmit a trigger frame 1910. The trigger frame 1910 may indicate AC-VO as the primary AC and STA1 as the primary station. STA1 and STA3 may respond to the trigger frame 1910 by sending uplink frames 1912 and 1914, respectively. The AP may transmit an acknowledgement frame 1916 upon receipt of the uplink frames 1912 and 1914.

In an aspect, STA1 may transmit frames associated with another AC (e.g., AC other than AC-VO) in a last uplink frame (e.g., uplink OFDMA frame) as long as AC-VO is included as one of the MPDUs in aggregate MPDU (A-MPDU). In an aspect, the other stations (e.g., non-primary stations) may transmit data from any AC during the UL MU transmission(s) (e.g., 1906 and 1914 do not contain AC-VO). In other words, in this aspect, the other stations are not limited to sending data associated with AC-VO.

Figure 20:
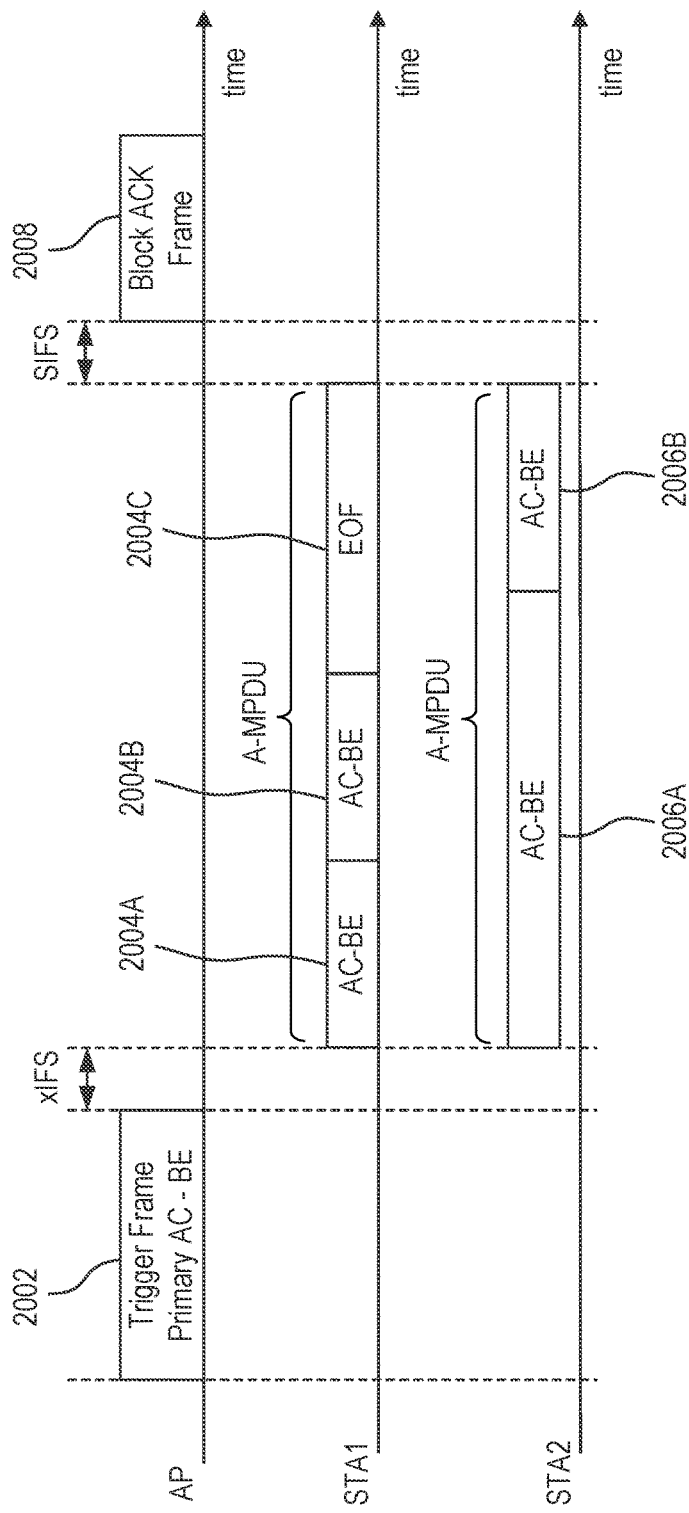
FIGS. 20 through 22 illustrate schematic diagrams of examples of exchanges of frames among wireless communication devices for MU transmission in a primary access category operation mode.

FIG. 20 illustrates a schematic diagram of an example of an exchange of frames among wireless communication devices for UL MU transmission in a primary access category operation mode. The AP may trigger MU transmission by transmitting a trigger frame 2002. The trigger frame 2002 may indicate a primary AC of best effort (BE). STA1 and STA2 may respond to the trigger frame 2002 by sending packets 2004A, 2004B, 2004C, 2006A, and 2006B in MU transmission format, where the MU transmissions only contain packets from the AC-BE (or packets from the AC-BE with padding bit(s)).

In FIG. 20, STA1 does not have sufficient data packets to send for the primary AC. To avoid the case where the transmission duration between stations (e.g., STA1, STA2) in MU transmission is not the same, the stations that do not have sufficient number of data packets to send for the primary AC indicated by the trigger frame 2002 may need to send padding bits, such as End-Of-Frame (EOF) MPDUs. In this regard, the packet 2004C may include padding bits, such an End-Of-Frame (EOF) MPDUs, when STA1 does not have sufficient number of data packets to send for AC-BE.

In this regard, STA1 may transmit an uplink frame that includes in its payload (e.g., HE-DATA) the packets 2004A, 2004B, and 2004C. The packets 2004A, 2004B, and 2006C may be multiplexed using aggregate MPDU (A-MPDU). Similarly, STA2 may transmit an uplink frame that includes in its payload the packets 2006A and 2006B, and the packets 2006A and 2006B may be multiplexed using A-MPDU. The AP may transmit an acknowledgement frame 2008 (e.g., block acknowledgement frame) upon receipt of the uplink frames from STA1 and STA2.

Figure 21:
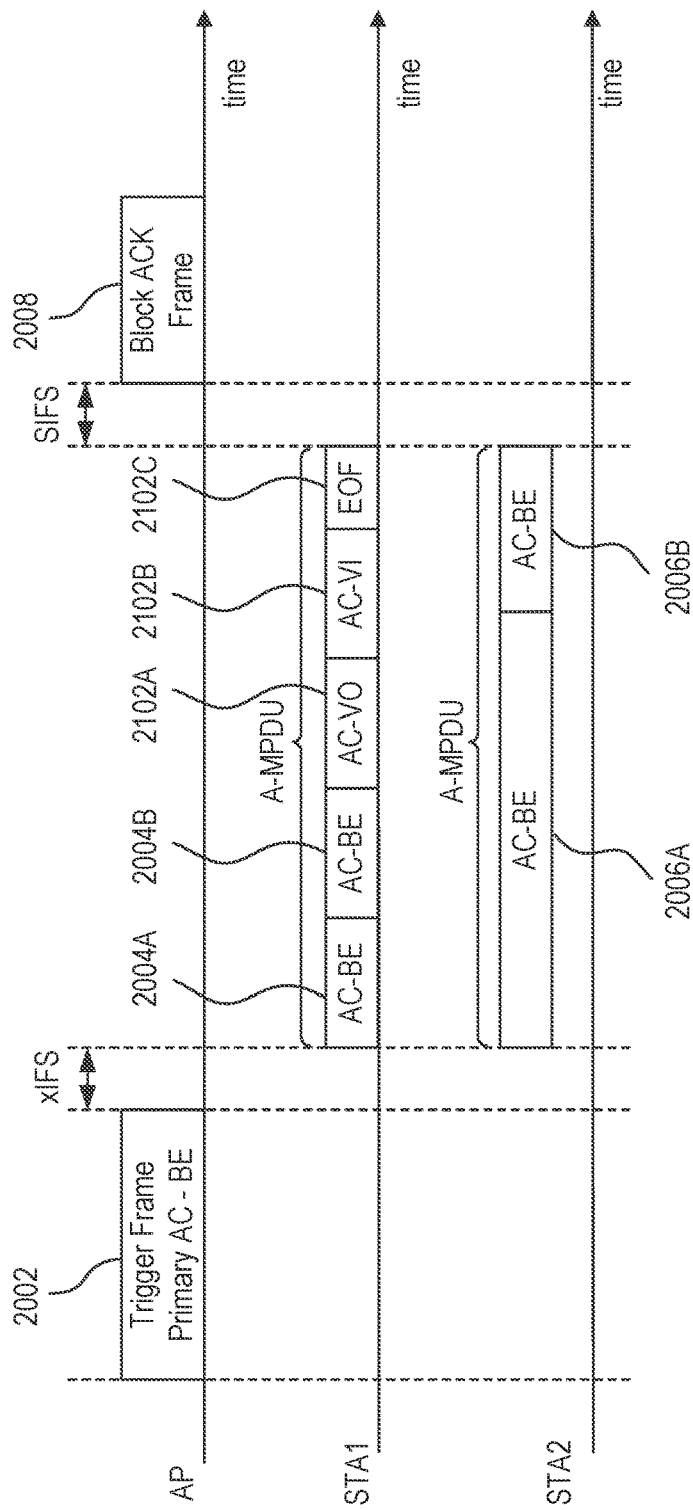

FIG. 21 illustrates a schematic diagram of an example of an exchange of frames among wireless communication devices for UL MU transmission in a primary access category operation mode. The description from FIG. 20 generally applies to FIG. 21, with examples of differences between FIG. 20 and FIG. 21 and other description provided herein for purposes of clarity and simplicity. In FIG. 21, STAs may send non-primary AC data packets during MU transmissions when the primary AC data queue is empty. In some cases, efficiency (e.g., in terms of spectrum usage) may be improved relative to FIG. 20 since fewer or no padding bits may need to be sent when the sending of non-primary AC data packets is allowed.

STA1 and STA2 may be assigned to MU transmissions by the trigger frame 2002, where the primary AC is indicated to be AC-BE in the trigger frame 2002. As an example, as shown in FIG. 21, STA2 may have a sufficient number of data packets for AC-BE to send during the MU transmission period, whereas STA1 does not have a sufficient number of data packets for AC-BE to send during the MU transmission period. STA1 may append data packets 2102A and 2102B from non-primary AC, for example AC-VO and/or AC-VI, after sending AC-BE data bits during the MU transmission. The packet 2004C of FIG. 20 is replaced with the data packets 2102A and 2102B. The packet 2102C, which includes padding bits, is smaller than the packet 2004C. The data packets 2004A, 2004B, 2102A, and 2102B of different AC (along with the packet 2102C containing padding bits) may be multiplexed using A-MPDU. In an aspect, to avoid a fairness issue among different ACs, stations may be limited to transmit non-primary AC data packets, e.g., AC not indicated in the trigger frame 2002, only when the primary AC data queue is empty. In an aspect, a station with an empty queue for the primary AC may be allowed to transmit an uplink frame that includes data only from non-primary ACs (e.g., the uplink frame contains no data for the primary AC).

In an aspect, the transmission priority among non-primary AC data packets does not exist and a station can freely choose data packets among non-primary AC to send within the allowed MU transmission period. In an aspect, the station may choose (e.g., optionally choose) to first send data packets of an AC with higher priority among non-primary AC. In an aspect, AC-VO data packets have the highest priority, followed by AC-VI, AC-BE, and AC-BK.

Figure 22:
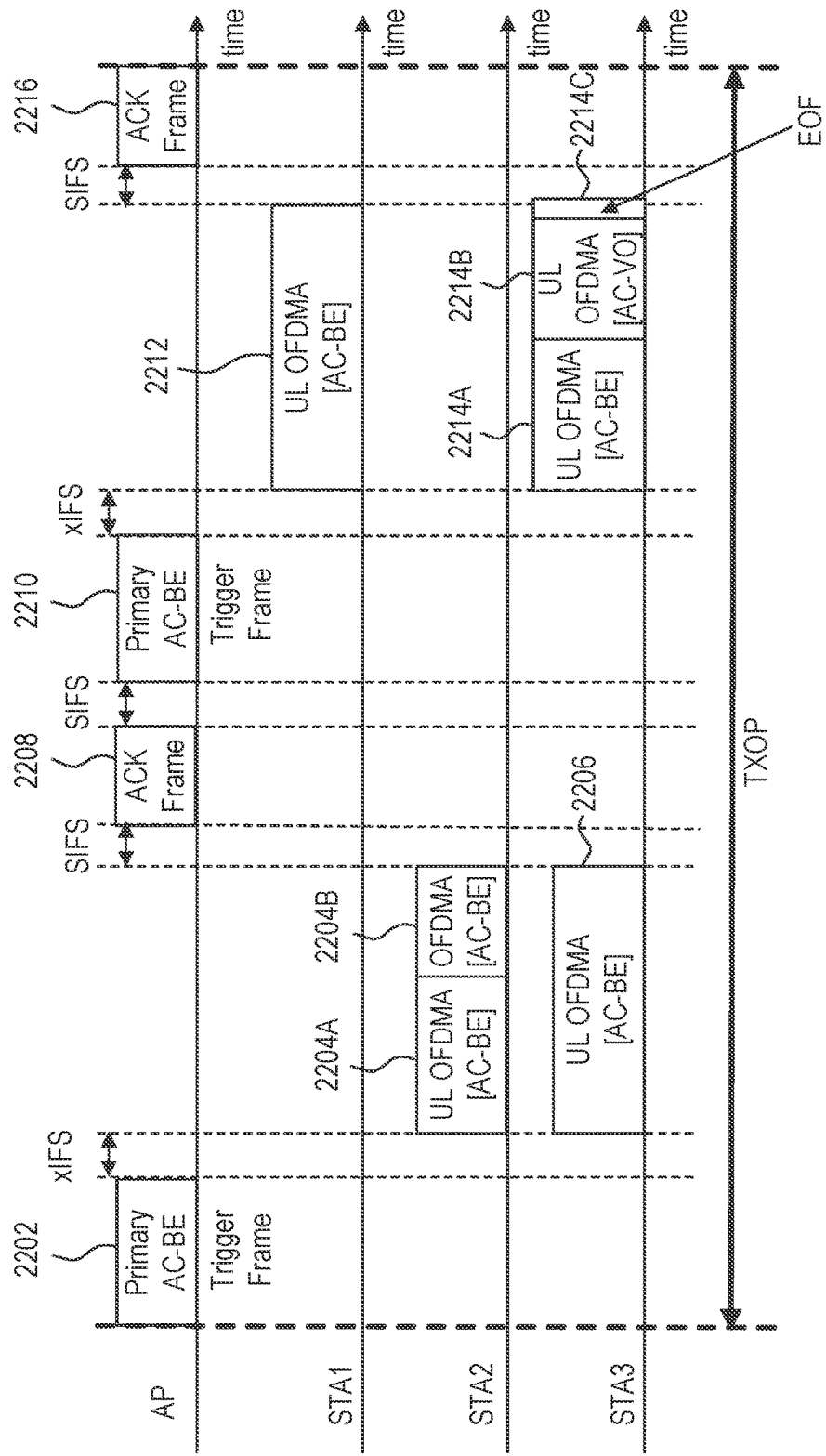

FIG. 22 illustrates a schematic diagram of an example of an exchange of frames among wireless communication devices for UL MU transmission in a primary AC operation mode. In FIG. 22, AC-BE is chosen to be the primary AC. In an aspect, the total AC-BE queue size from all stations (e.g., STA1, STA2, STA3) participating in UL MU transmission may be gathered (or estimated) by the AP and used to determine the TXOP duration. In another aspect, the AP may utilize a maximum TXOP duration allowed by the IEEE 802.11 specification (e.g., rather than computing a TXOP duration based on the gathered/estimated queue size(s)). In an aspect, the stations may only be allowed to transmit AC-BE unless the data queue for primary AC is empty, in which case the stations may be allowed to transmit data packets in the data queue for other AC.

The AP may transmit a trigger frame 2202 that indicates the AC of BE. In response to the trigger frame 2202, STA2 may transmit packets 2204A and 2204B containing AC-BE data and STA3 may transmit a packet 2206 containing AC-BE data. The packets 2204A and 2204B may be multiplexed using A-MPDU. The packets 2204A and 2204B may be a payload (e.g., HE-DATA) of an uplink frame. The packet 2206 may be a payload of an uplink frame. The AP may transmit an acknowledgement frame 2208 (e.g., block acknowledgement frame) upon receipt of the uplink frames from STA1 and STA2.

Within the remaining TXOP duration, the AP may transmit a trigger frame 2210. In response to the trigger frame

2210, STA1 may transmit a packet 2212 containing AC-BE data and STA3 may transmit packets 2214A, 2214B, and 2214C containing AC-BE data, AC-VO data, and padding bits, respectively. The packet 2212 may be a payload of an uplink frame. The packets 2214A, 2214B, and 2214C may be a payload (e.g., HE-DATA) of an uplink frame. The AP may transmit an acknowledgement frame 2216 upon receipt of the uplink frames.

In some aspects, UL MU transmission may be operated either in primary user or primary AC mode based on which node (e.g., non-AP station or AP) is the TXOP holder. For example, in an aspect, if the non-AP station is the TXOP holder, the UL MU transmission may operate in a primary user mode (e.g., with the TXOP holder being the primary user). In an aspect, if the AP is the TXOP holder, the UL MU transmission may operate in a primary AC mode.

Although trigger frames are depicted as if they were downlink MSDUs in FIGS. 11 and 13-17, the trigger frames are generally management frames and may not exist in physical queue, rather only existing virtually within a virtual queue. Since the trigger frames are virtual in nature, multiple trigger frames requested by different stations may be combined into a first instance of the trigger frame (e.g., a not yet transmitted instance of the trigger frame).

In one or more implementations, a station that has obtained a TXOP duration may transfer the TXOP duration to the AP to allow the AP to trigger UL MU transmissions. The transfer of the TXOP duration may be referred to as a TXOP transfer. The AP that has received the TXOP duration from the station can utilize the rest (e.g., remaining) of the TXOP duration (without starting or contending for a new TXOP) for UL MU transmissions.

In some aspects, a station may be allowed to transfer its TXOP under certain conditions. For instance, to avoid medium access fairness issues, the station may be only allowed to transfer TXOP if the queue of the EDCA AC that obtained TXOP (e.g., EDCA AC that won the contention) is empty. The station that has an empty queue of the AC that obtained TXOP can perform one of the following: 1) do nothing and let the TXOP duration expire, 2) transmit a contention free-end (CF-End) frame that terminates the TXOP, or 3) perform a TXOP transfer to the AP. In some cases, during the TXOP duration obtained by the station, the station may be allowed to transmit only those data frames associated with the EDCA AC that obtained the TXOP. In such cases, the station may perform the TXOP transfer to the AP, such that the AP may transmit a trigger, frame to allow the station to transmit data frames associated with other EDCA AC. In an embodiment, the station may perform a TXOP transfer to the AP if the station has a non-empty queue for an AC other than the AC for the TXOP that the station owns. In an embodiment, the station may perform a termination of the TXOP or do nothing if the station does not have a non-empty queue for an AC other than the AC for the TXOP that the station owns (e.g., if the station's queues for all ACs are empty).

Figure 23:
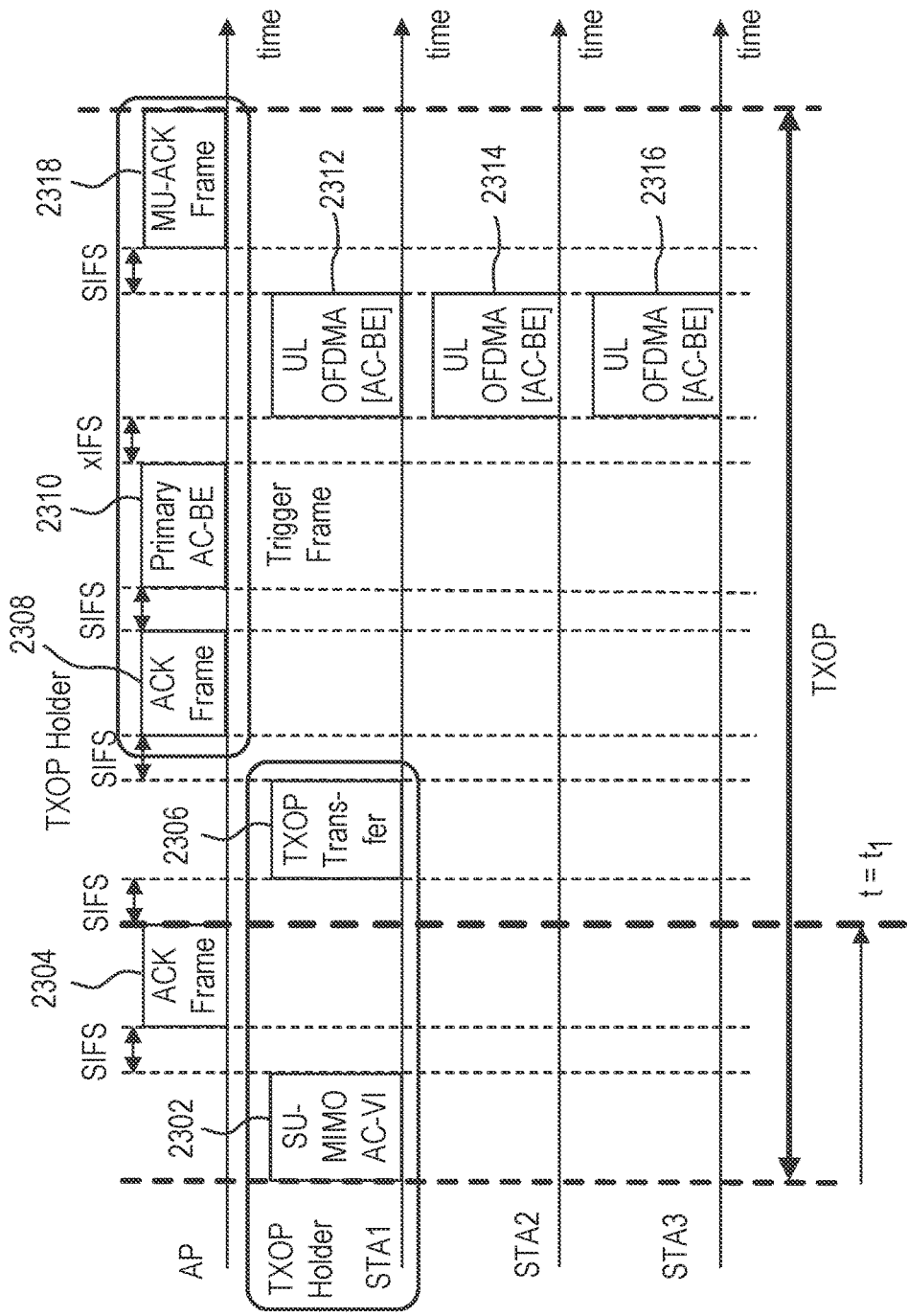
FIGS. 23 through 35 illustrate schematic diagrams of examples of exchanges of frames among wireless communication devices for MU transmission.

FIG. 23 illustrates a schematic diagram of an example of an exchange of frames among wireless communication devices for UL MU transmission. STA1 is an initial TXOP holder by winning the medium through its transmission of an uplink frame 2302 associated with AC-VI (e.g., the uplink frame 2302 contains data of AC-VI) to the AP. In this regard, STAT obtained the TXOP using AC-VI. The uplink frame 2302 may be an SU-MIMO frame.

The AP may transmit an acknowledgement frame 2304 upon successful receipt of the uplink frame. At a time $t=t_1$, the AC-VI queue of STA1 may be empty. In an aspect, STA1 may transmit a CF-End frame to terminate and truncate the TXOP. In another aspect, as shown in FIG. 23, STA1 may transfer the TXOP to the AP for facilitating UL MU transmission (e.g., UL MU OFDMA). The station may transmit an uplink frame 2306 (e.g., data frame, control frame) that includes an indication of the TXOP transfer. In an aspect, the uplink frame 2306 may be referred to as a TXOP transfer frame or a TXOP transfer request frame. In another aspect, the AP may respond to the TXOP transfer with an acknowledgement frame 2308 and the TXOP transfer is complete. From that point on, the AP owns the TXOP duration. The uplink frame 2306 may include an indication of a buffer status for one or more of the AC queues.

The AP, which is now the TXOP holder, may transmit a trigger frame 2310. The trigger frame 2310 may allow the stations to transmit data frames associated with AC-BE. In an aspect, the AP may allow transmission of data frames associated with a certain AC based on the buffer status associated with STA1 (e.g., the station that transferred ownership of the TXOP). In response to the trigger frame 2310, STA1, STA2, and STA3 may transmit respective uplink frames 2312, 2314, and 2316 (e.g., using respective resource allocation indicated in the trigger frame 2310). The uplink frames 2312, 2314, and 2316 may include AC-BE data. In an aspect, the uplink frames 2312, 2314, and 2316 may be transmitted in an OFDMA manner. The AP may transmit an acknowledgement frame 2318 (e.g., MU ACK frame) upon receipt of the uplink frames 2312, 2314, and 2316.

In an aspect, during TXOP transfer, STA1 may indicate (e.g., may need to indicate) the time duration remaining for the TXOP duration such that AP knows how much time is left in the TXOP duration. The indication may be included in the uplink frame 2306. In some cases, the AP should only accept the TXOP transfer if the AP can allow a complete UL MU transmission process to occur within the remaining time in the TXOP duration. A complete UL MU transmission process may include a trigger frame transmission, UL MU transmissions, and an acknowledgement transmission. In case the time duration remaining in the TXOP is insufficient to perform uplink MU transmissions, the AP can refuse the TXOP transfer and STA1 can perform termination of the TXOP or do nothing after receiving the AP's refusal. In an aspect, the AP may indicate acceptance or refusal of the TXOP transfer in the acknowledgement frame 2308. In an aspect, the AP cannot extend the TXOP duration that is transferred from the STA1 to the AP.

In an aspect, during TXOP transfer, STA1 may indicate the AC of the TXOP to be utilized by the AP once the AP owns the TXOP. In this case, the AP may use the AC indicated by STA1 as the primary AC of the UL MU transmission. Alternatively, the AP may assign STA1 as the primary user of the UL MU transmission. In an aspect, if a primary AC is assigned to the UL MU transmissions, the stations participating the MU transmission shall transmit at least one data packet from the primary AC. In some cases of this aspect, the participating stations may be allowed to transmit only packets associated with non-primary ACs (e.g., allowed to transmit no packets associated with the primary AC) when the queue associated with the primary AC is empty. In an aspect, if a primary user is assigned to the UL MU transmission, the AP shall always assign or allocate resources for the station determined (e.g., designated) to be the primary user.

In one or more implementations, an inter-frame spacing (IFS) time between a trigger frame and UL MU transmission, such as OFDMA transmission, is indicated in the trigger frame. For example, either SIFS or PIFS can be indicated in the trigger frame, where PIFS may defined as SIFS+aSlotTime and aSlotTime may be defined as 9 microseconds. In addition, in an aspect, the AP may indicate a long IFS (e.g., PIFS) interval between the trigger frame and the UL MU transmission if no legacy device protection frames were negotiated between AP and stations participating in MU transmission. In this case, the stations participating in MU transmission may only transmit signals if the medium is idle for the entire PIFS interval after the trigger frame.

In some aspects, if the TXOP holder (e.g., the node that has obtained the TXOP duration), is a station (e.g., non-AP station), the IFS between the trigger frame and the UL MU transmission may need to be PIFS to allow the TXOP holder to perform TXOP recovery. In an aspect, the TXOP recovery may be performed by the TXOP holder by transmission of a frame within PIFS duration after reception of a frame, for example in SIFS after end of the last frame. In this case, the stations waiting (and scheduled) to transmit a UL MU transmission frame should not transmit an uplink frame if they detect signals during the longer IFS interval indicated by the AP. In some aspects, if the TXOP holder is the AP, the trigger frame can indicate SIFS interval between UL MU transmission and the trigger frame.

In one or more implementations, error recovery procedures with various IFS interval between the trigger frame and UL MU transmissions are provided.

Figure 24:
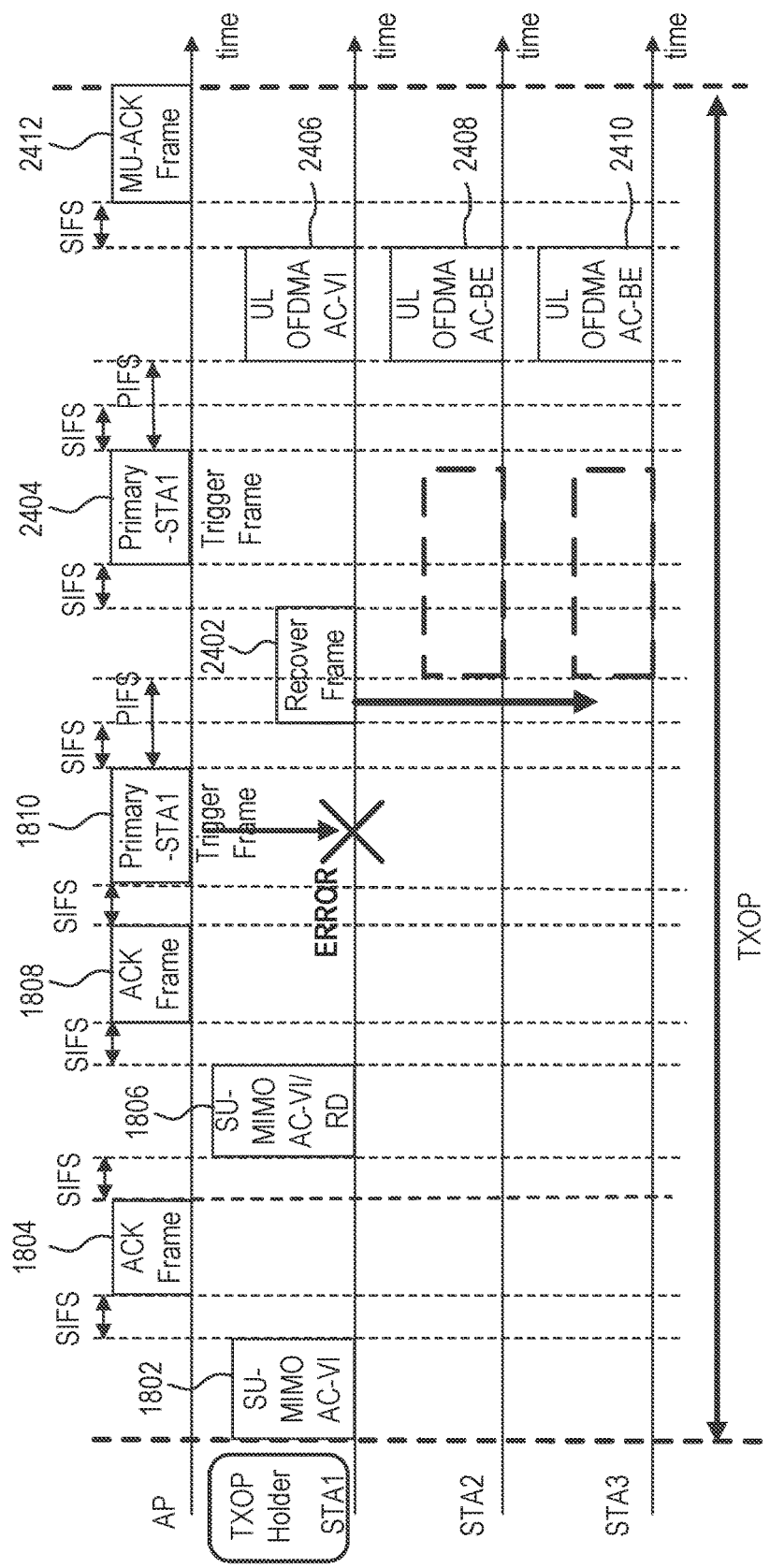

FIG. 24 illustrates a schematic diagram of an example of an exchange of frames among wireless communication devices for UL MU transmission. The description from FIG. 18 generally applies to FIG. 24, with examples of differences between FIG. 18 and FIG. 24 and other description provided herein for purposes of clarity and simplicity. STA1, which is the TXOP holder, may sends a TXOP sharing indication to the AP along with the uplink frame 1806 (denoted as RD), which is the sent data frame. For instance, the TXOP sharing indication may be contained in the uplink frame 1806. The AP may transmit the acknowledgement frame 1808 to acknowledge successful reception of the uplink frame 1806 and also acknowledge that the AP accepts the TXOP sharing. The AP may transmit the trigger frame 1810 at SIFS interval after the acknowledgement frame 1808. The trigger frame 1810 may include a PIFS interval configuration. In this regard, all stations participating in the UL MU transmission may be expected to transmit PIFS interval after the trigger frame 1810. However, STA1, which is the TXOP holder, may fail to decode the trigger frame 1810 and may take control (e.g., try to take control) of the medium SIFS time after the trigger frame 1810. Other stations (e.g., STA2, STA3) participating the MU transmission may detect signal before PIFS interval and stop transmission of MU transmission.

Figure 25:
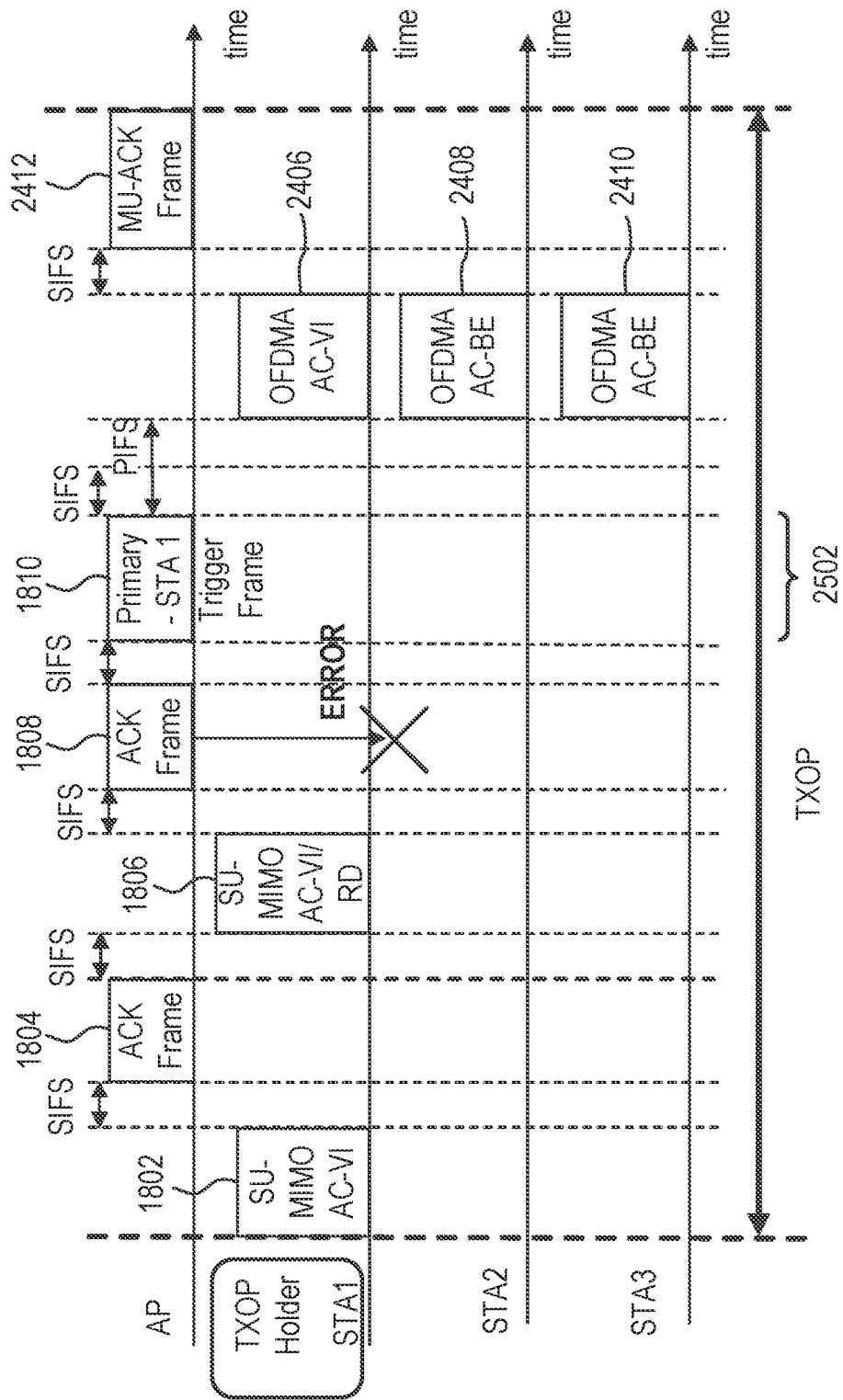

FIG. 25 illustrates a schematic diagram of an example of an exchange of frames among wireless communication devices for UL MU transmission. The description from FIG. 24 generally applies to FIG. 25, with examples of differences between FIG. 24 and FIG. 25 and other description provided herein for purposes of clarity and simplicity. In FIG. 25, STA1 fails to decode the acknowledgement frame 1808 from the AP that contains the acknowledgement of the TXOP sharing. Because STA1 fails to decode the acknowledgement frame 1808, STA1 may try to perform PIFS recovery operation. In an aspect, STA1 may perform PIFS recovery by transmitting a frame after the medium is idle for PIFS period. However, the AP may continue with the transmission of the trigger frame 1810 as the AP does not know that STA1 has failed to decode/receive the acknowledgement frame 1808. Because the trigger frame 1810 is sent SIPS interval after the acknowledgement frame 1808, STA1 cannot perform PIFS recovery right after the failed acknowledgement frame 1808. In this regard, STA1 is unable to perform PIFS recovery of the acknowledgement frame 1808 in a time duration 2502, since the trigger frame 1810 is sent in SIFS, which is before STA1 has taken over the medium. Instead, STA1 may successfully decode the trigger frame 1810 and participate in the UL MU transmission. In this regard, in response to the trigger frame 1810, STA1, STA2, and STA3 may transmit uplink frames 2406, 2408, and 2410, respectively (e.g., in OFDMA manner). Upon receipt of the uplink frames 2406, 2408, and 2410, the AP may transmit an acknowledgement frame 2412 (e.g., MU acknowledgement frame).

Figure 26:
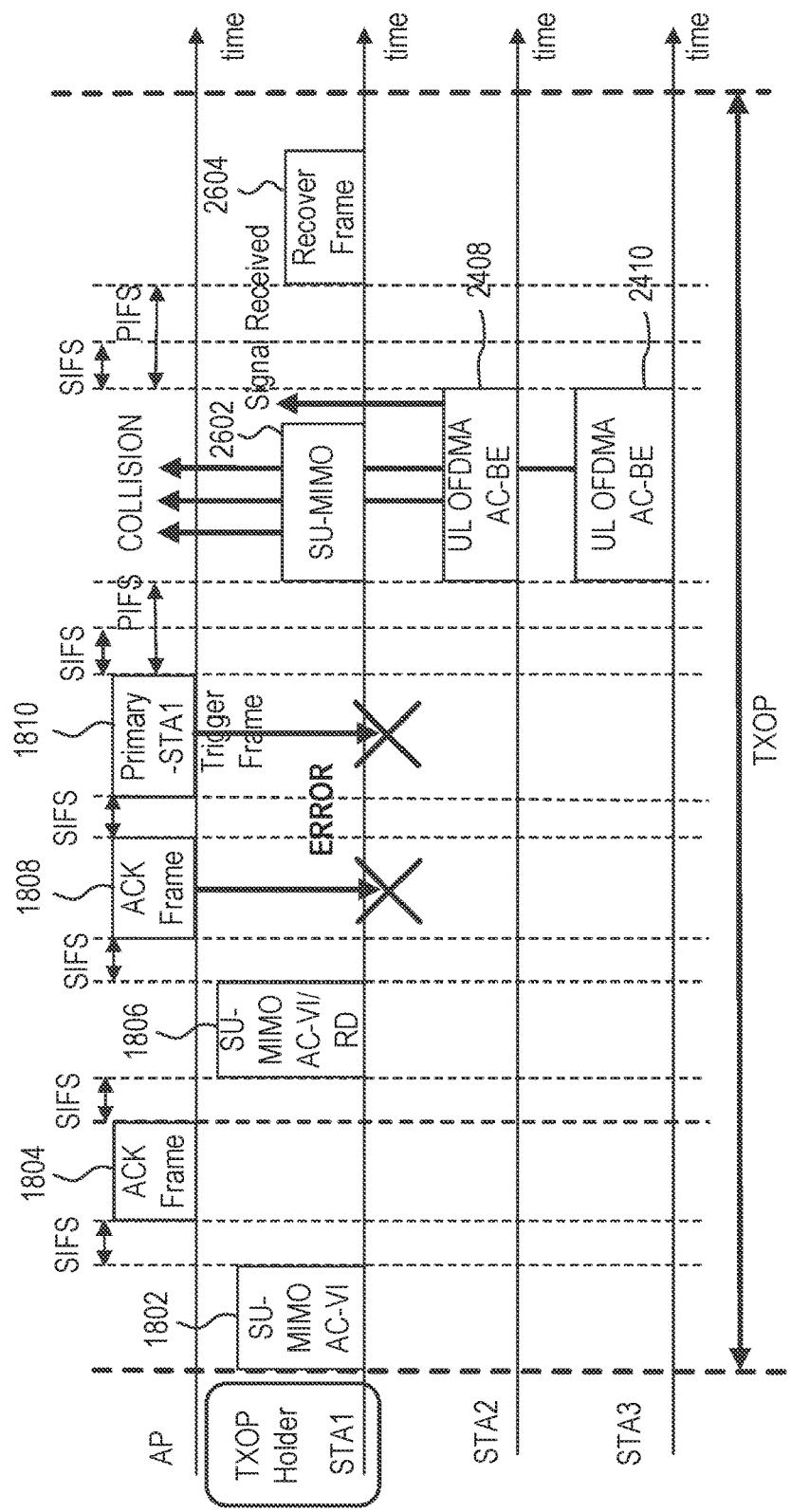

FIG. 26 illustrates a schematic diagram of an example of an exchange of frames among wireless communication devices for UL MU transmission. The description from FIG. 25 generally applies to FIG. 26, with examples of differences between FIG. 25 and FIG. 26 and other description provided herein for purposes of clarity and simplicity. In FIG. 26, STA1 fails to decode both the acknowledgement frame 1808 and the trigger frame 1810. Therefore, STA1 may perform PIFS recovery by sending an uplink frame 2602 (e.g., SU-MIMO frame) after the failed trigger frame. The uplink frame 2602 may be a retransmission of the uplink frame 1806, since STA1 fails to decode the acknowledgement frame 1808. This may cause collision between UL MU transmission and the uplink frame 2602 from STA1. For instance, if STA2 (and/or STA3) does not detect the signal associated with the uplink frame 2602, STA2 (and/or STA3) may transmit the uplink frame 2408 (and/or 2410, respectively) and cause a collision. If STA2 and STA3 detect the signal, STA2 and STA3 do not transmit the uplink frames 2408 and 2410, respectively, and collision may be avoided. If a collision occurs, STA1 may perform PIFS recovery by transmitting an uplink frame 2604. In an aspect, the collision illustrated in FIG. 26 generally has a low likelihood of occurring, and in many scenarios it would be cases where STA1 is having strong interference from other radiating sources.

Figure 27:
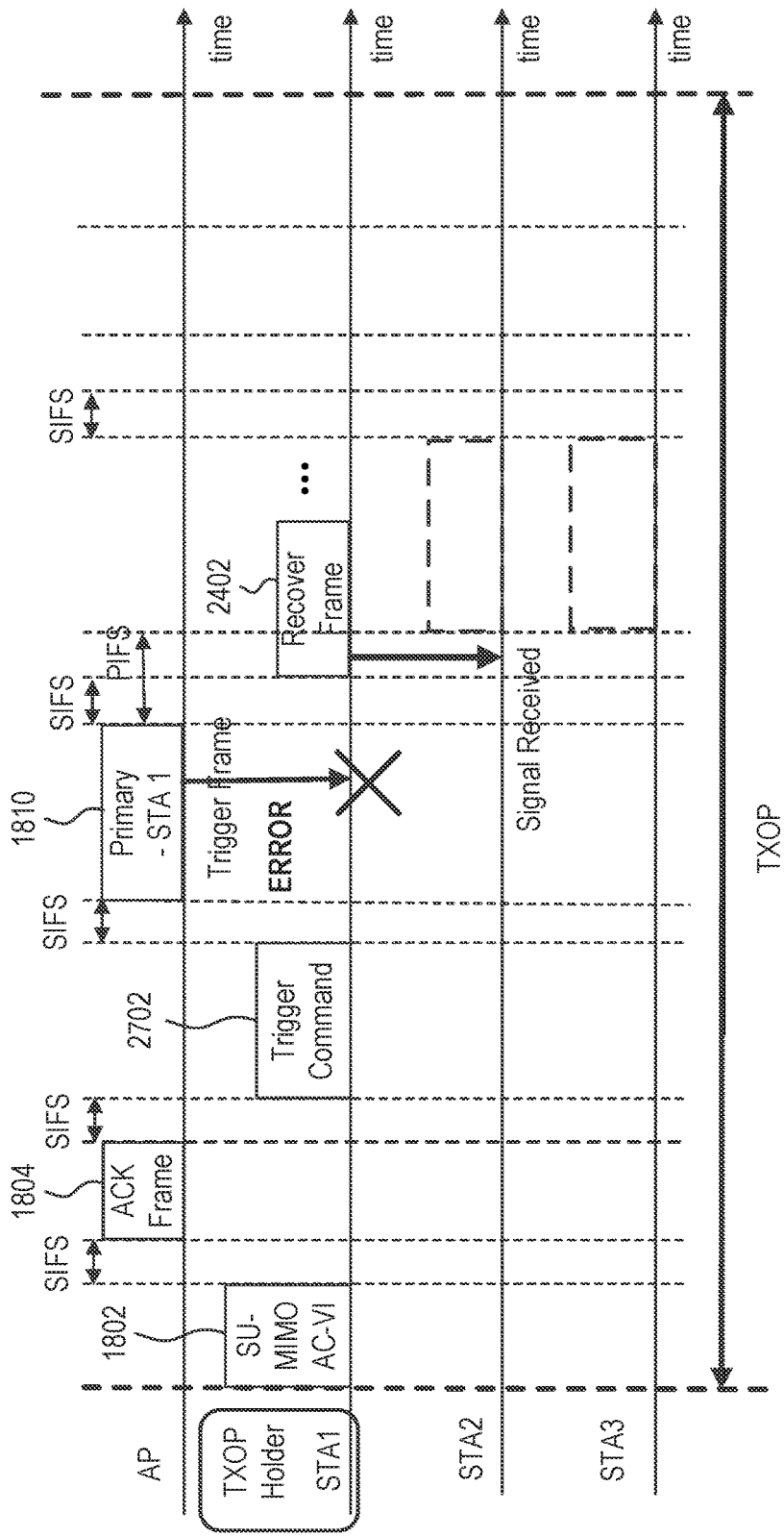

FIG. 27 illustrates a schematic diagram of an example of an exchange of frames among wireless communication devices for UL MU transmission. The description from FIG. 24 generally applies to FIG. 27, with examples of differences between FIG. 24 and FIG. 27 and other description provided herein for purposes of clarity and simplicity. In FIG. 27, STA1 may send a separate uplink frame 2702 dedicated to request for the trigger frame 1810 (and/or to allow TXOP sharing), rather than piggybacking a TXOP sharing indication along with data (e.g., in the uplink frame 1806). In an aspect, the uplink frame 2702 may be referred to as a trigger request frame, trigger command frame, trigger command, or a variant thereof. However, in case STA1, which requested the trigger frame 1810, fails to decode the trigger frame 1810 correctly, STA1 can perform SIFS recovery (e.g., reclaim the medium SIFS after the trigger frame 1810) instead of the regular PIFS recovery. STA2 and STA3 may avoid a collision by detecting an uplink frame 2402 during PIFS wait and not transmitting a frame (e.g., OFDMA frame). In an aspect, the uplink frame 2402 may be referred to as a recovery frame since the uplink frame 2402 is being utilized by STA1 to take back the medium. With reference back to FIG. 24, the AP may transmit a trigger frame 2404. STA1, STA2, and STA3 may transmit the uplink frames 2406, 2408, and 2410, respectively (e.g., in OFDMA manner). Upon receipt of the uplink frames 2406, 2408, and 2410, the AP may transmit the acknowledgement frame 2412 (e.g., MU acknowledgement frame). The behavior in FIG. 27 may be similar to the behavior in the example shown in FIG. 24.

Figure 28:
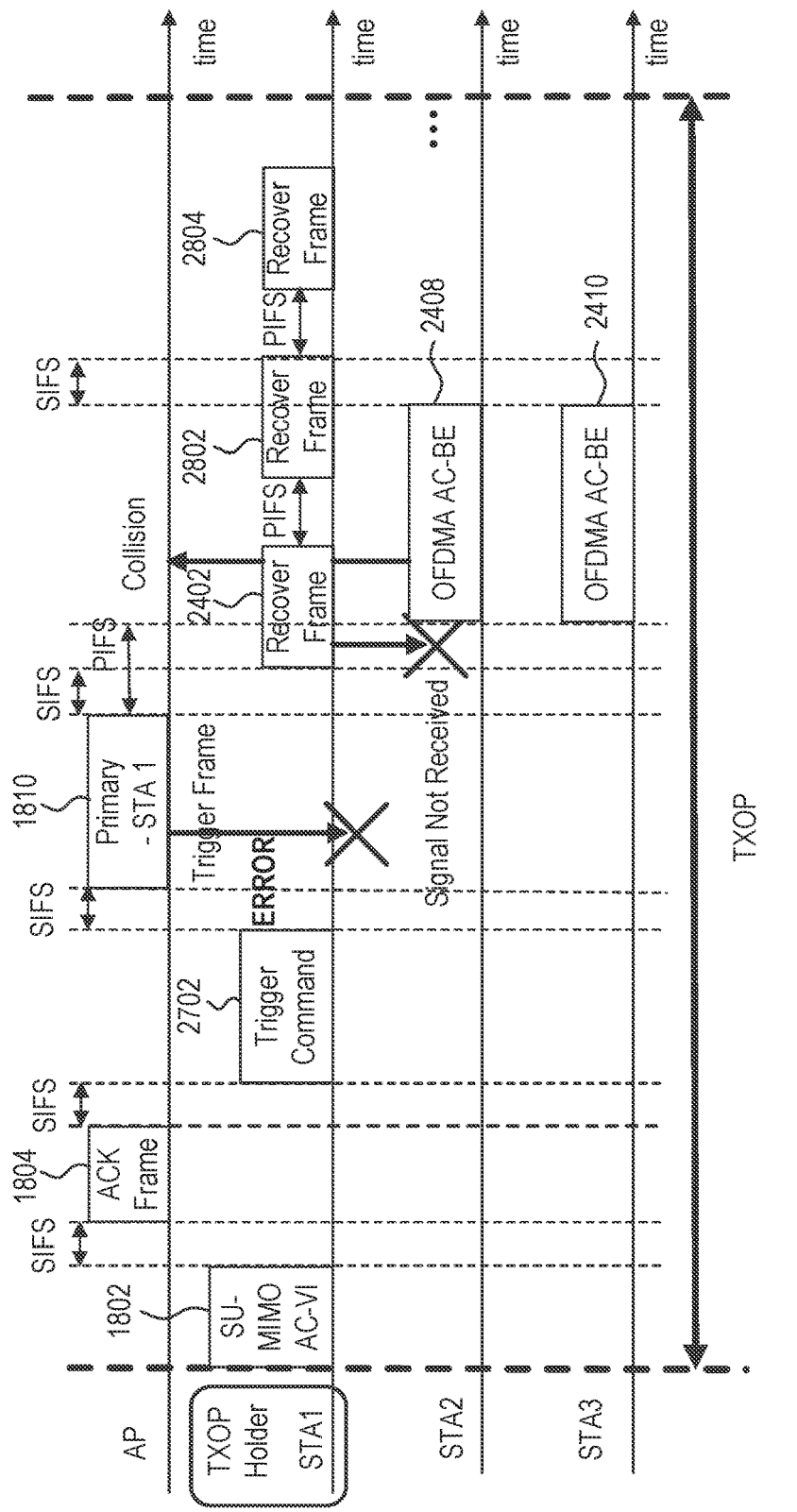

FIG. 28 illustrates a schematic diagram of an example of an exchange of frames among wireless communication devices for UL MU transmission. The description from FIG. 27 generally applies to FIG. 28, with examples of differences between FIG. 27 and FIG. 28 and other description provided herein for purposes of clarity and simplicity. In FIG. 28, STA1 may send the uplink frame 2702 (e.g., TXOP sharing indicating frame), but may fail to correctly receive the trigger frame 1810 that follow the uplink frame 2702. STA1, which is the TXOP holder, may transmit the uplink frame 2402 after SIFS interval from the failed reception of trigger frame 1810 following the uplink frame 2702. The uplink frame 2402 from STA1 may collide with the uplink frames 2408 and 2410 from STA2 and STA3 and decoding may fail at the AP. In an aspect, the failure in decoding at the AP may be regardless of whether STA1 is able to receive signals from STA2 and/or STA3. STA1 may perform a PIFS recovery by transmitting an uplink frame 2802 and another PIFS recovery by transmitting an uplink frame 2804.

FIGS. 29 through 35 illustrate schematic diagrams of examples of exchanges of frames among wireless communication devices. In FIGS. 29 through 35, the UL MU transmission may operate with SIFS interval between the UL MU transmissions and the trigger frame.

Figure 29:
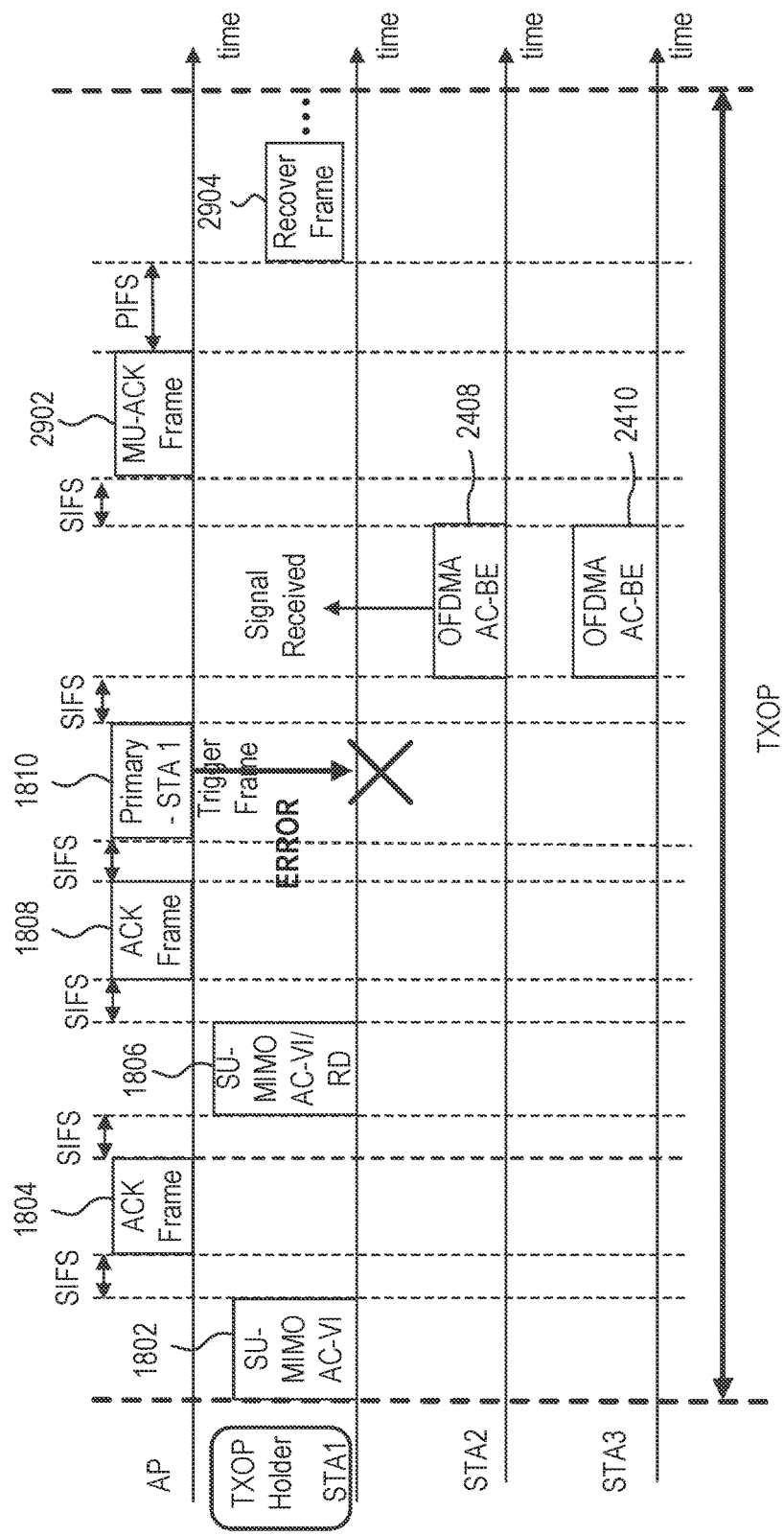

With reference to FIG. 29, the description from FIG. 26 generally applies to FIG. 29, with examples of differences between FIG. 26 and FIG. 29 and other description provided herein for purposes of clarity and simplicity. In FIG. 29, STA1 is the TXOP holder and may allow TXOP sharing with the AP and other stations for UL MU transmissions. STA1 may fail to decode the trigger frame 1810 that followed the acknowledgement frame 1808 of the TXOP sharing indication (e.g., contained in the uplink frame 1806) from STA1. Because UL MU transmission from other stations can be received at STA1, STA1 may wait until an end of a single UL MU transmission sequence to transmit a frame 2904 to reclaim the medium (e.g., assuming transmission of the frame 2904 to reclaim the medium is sent within the TXOP duration acquired by STA1). In this regard, STA1 may transmit the frame 2904 after a time (e.g., SIFS time, PIFS time) that the medium is idle. The single UL MU transmission sequence may include the trigger frame 1810, followed by UL MU transmission of the uplink frames 2408 and 2410, followed by an acknowledgement frame 2902 (e.g., MU acknowledgement frame).

Figure 30:
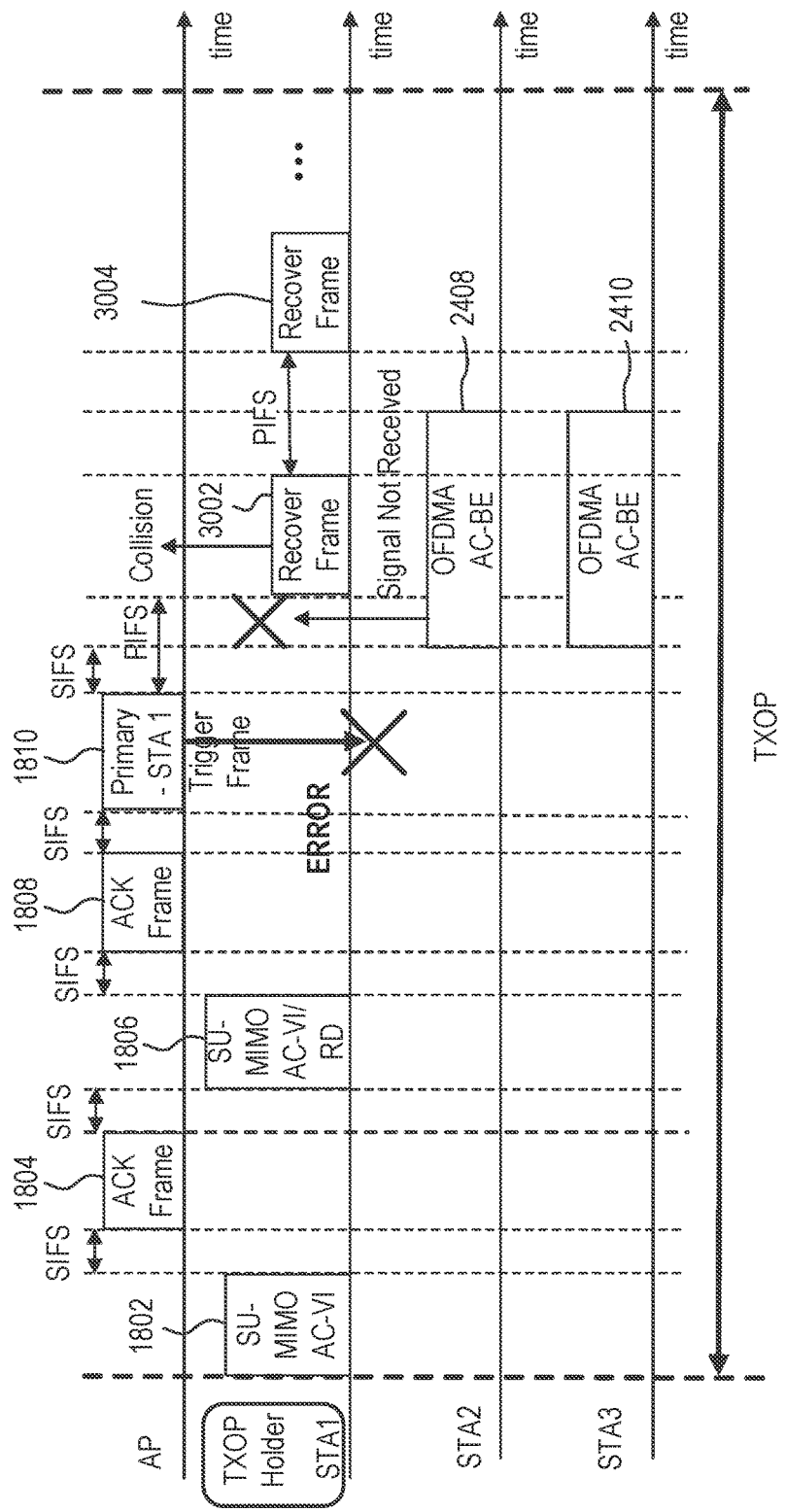

With reference to FIG. 30, the description from FIG. 29 generally applies to FIG. 30, with examples of differences between FIG. 29 and FIG. 30 and other description provided herein for purposes of clarity and simplicity. In FIG. 30, STA1 is the TXOP holder and may allow TXOP sharing with the AP and other stations for UL MU transmissions. STA1 may fail to decode the trigger frame 1810 that followed the acknowledgement frame 1808 of the TXOP sharing indication (e.g., contained in the uplink frame 1806) from STA1. The UL MU transmission from other stations is not received at STA1, and STA1 waits PIFS to transmit a frame 3002 to reclaim the medium (e.g., assuming transmission of the frame 3002 to reclaim the medium is sent within the acquired TXOP duration). However, the non-MU transmission of the frame 3002 from STA1 collides with MU transmission (e.g., the uplink frames 2408 and 2410) from the other stations and results in transmission failure. STA1 may try to reclaim the medium (using PIFS recovery) until a successful frame exchange occurs. STA1 may transmit a frame 3004 as one attempt to reclaim the medium.

Figure 31:
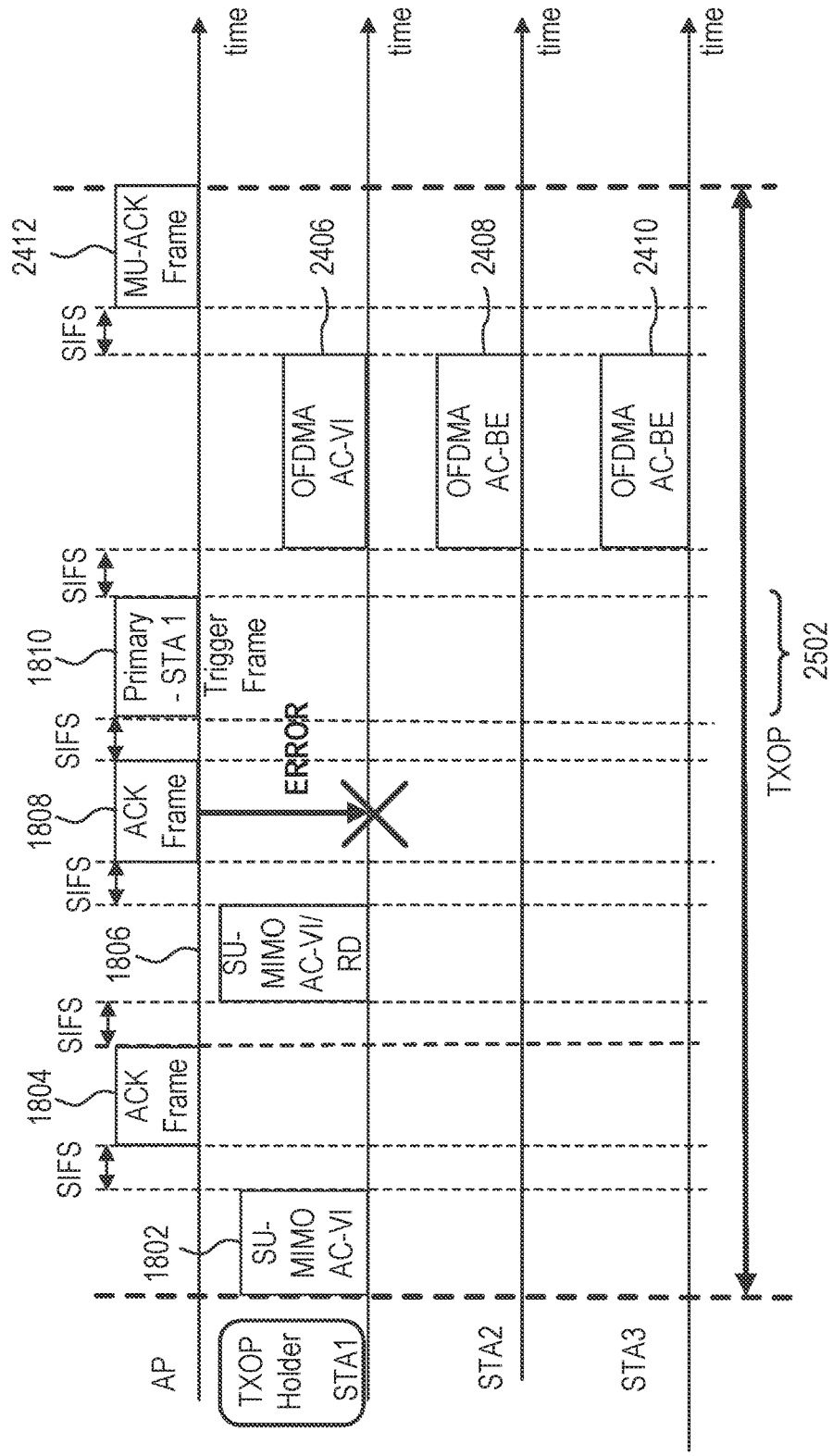

With reference to FIG. 31, the description from FIG. 25 generally applies to FIG. 31, with examples of differences between FIG. 25 and FIG. 31 and other description provided herein for purposes of clarity and simplicity. In FIG. 31, STA1 is the TXOP holder and may allow TXOP sharing with the AP and other stations for UL MU transmissions. STA1 may fail to decode the acknowledgement frame 1808 to the TXOP sharing indication (e.g., contained in the uplink frame 1806), but may be able to successfully decode the trigger frame 1810 that followed the acknowledgement frame 1808 of the TXOP sharing indication. STA1 may participate in the UL MU transmissions (as indicated in the trigger frame 1810).

Figure 32:
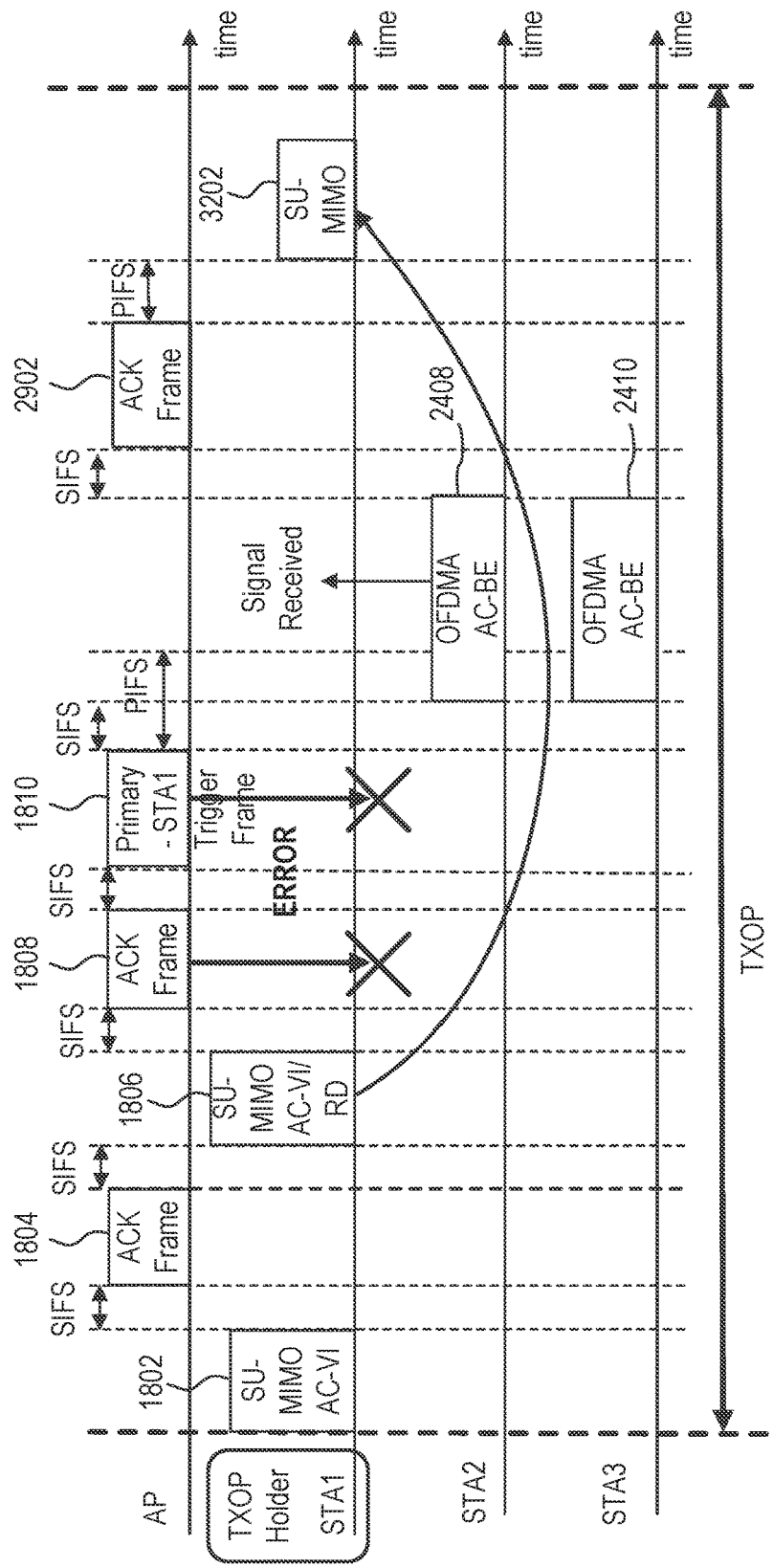

With reference to FIG. 32, the description from FIG. 29 generally applies to FIG. 32, with examples of differences between FIG. 29 and FIG. 32 and other description provided herein for purposes of clarity and simplicity. In FIG. 32, STA1 is the TXOP holder and may allow TXOP sharing with the AP and other stations for UL MU transmissions. STA1 may fail to decode the acknowledgement frame 1808 to the TXOP sharing indication (e.g., contained in the uplink frame 1806) and may also fail to correctly decode the trigger frame 1810. Because UL MU transmission from the other stations can be received at STA1, STA1 may wait until end of a single UL MU transmission sequence to transmit a frame 3202 (e.g., SU-MIMO) to reclaim the medium (e.g., assuming transmission the frame to reclaim the medium is sent within the acquired TXOP duration). In an aspect, the frame 3202 may be a recovery frame (e.g., a retransmission of the frame 1806), since STA1 has not successfully received/decoded an acknowledgement frame of the frame 1806. The single UL MU transmission sequence may include the trigger frame 1810, followed by UL MU transmission of the uplink frames 2408 and 2410, followed by the acknowledgement frame 2902.

Figure 33:
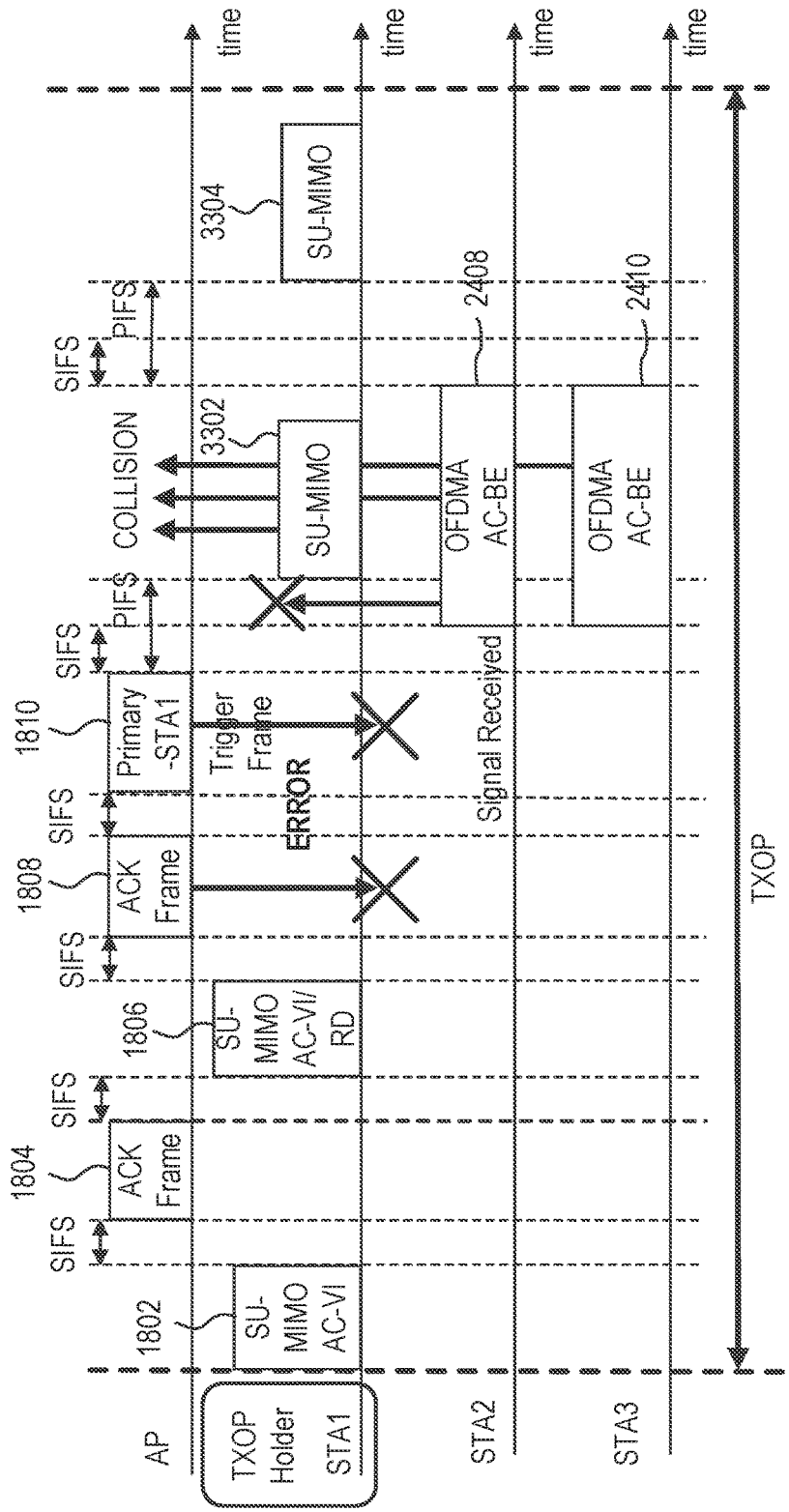

With reference to FIG. 33, the description from FIG. 26 generally applies to FIG. 33, with examples of differences between FIG. 26 and FIG. 33 and other description provided herein for purposes of clarity and simplicity. In FIG. 33, STA1 is the TXOP holder and may allow TXOP sharing with the AP and other stations for UL MU transmissions. STA1 may fail to decode the acknowledgement frame 1808 to the TXOP sharing indication (e.g., contained in the uplink frame 1806) and may also fail to correctly decode the trigger frame 1810. The UL MU transmission from the other stations is not received at STA1, and STA1 may wait PIFS to transmit a frame 3302 (e.g., a recovery frame) to reclaim the medium (e.g., assuming transmission of the frame 3302 to reclaim the medium is sent within the acquired TXOP duration). However, the non-MU transmission from STA1 collides with MU transmission from the other stations and results in transmission failure. STA1 may try to reclaim the medium (using PIFS recovery) until a successful frame exchange occurs. STA1 may transmit a frame 3304 (e.g., a recovery frame) as one attempt to reclaim the medium.

Figure 34:
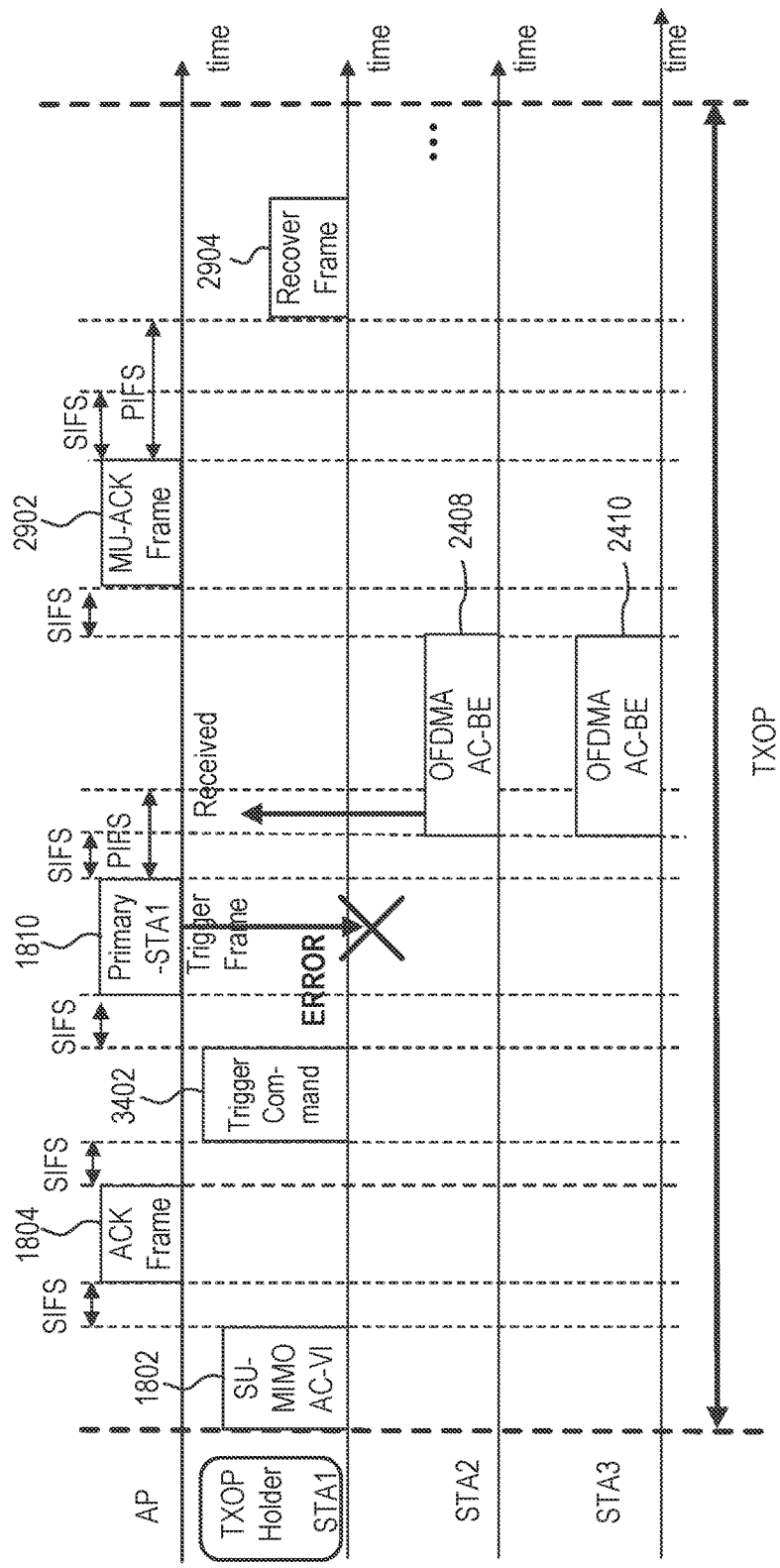

With reference to FIG. 34, the description from FIG. 29 generally applies to FIG. 34, with examples of differences between FIG. 29 and FIG. 34 and other description provided herein for purposes of clarity and simplicity. In FIG. 34, STA1 is the TXOP holder and may allow TXOP sharing with the AP and other stations for UL MU transmissions. STA1 may send a separate uplink frame 3402 dedicated to request for the trigger frame 1810 (and/or to allow TXOP sharing), rather than piggybacking a TXOP sharing indication along with data. STA1 may fail to correctly decode the trigger frame 1810 that is sent as a response to the TXOP sharing indication. In this example, there is no separate acknowledgement for the TXOP sharing indication). The UL MU transmission from other stations may be received at STA1, and STA1 may wait PIFS interval after the UL MU transmission sequence to initiate the PIFS recovery (e.g., since the medium is busy during the whole period, or at least not continuously idle for PIFS period). The UL MU transmission sequence may include the trigger frame 1810, uplink frames 2408 and 2410, and acknowledgement frame 2902. In an aspect, STA1 may detect that the medium was busy until receiving the acknowledgement frame 2902 from the AP. In an aspect, the AP should not continue to transmit frames with SIFS after the acknowledgement frame 2902 if the transmission from the primary user STA1 fails. The AP should allow STA1 to perform a PIFS recovery procedure.

Figure 35:
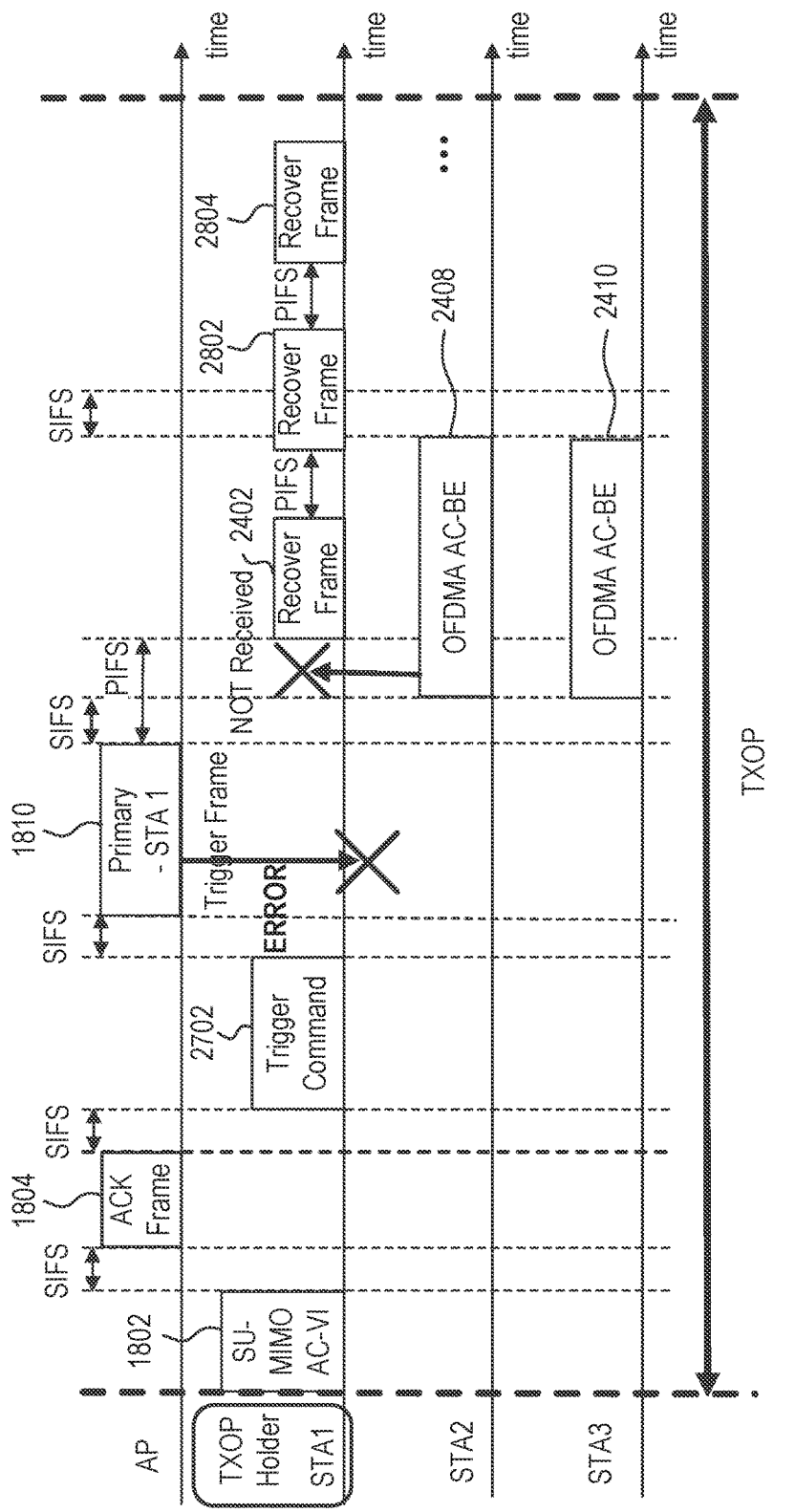

With reference to FIG. 35, the description from FIG. 28 generally applies to FIG. 35, with examples of differences between FIG. 28 and FIG. 35 and other description provided herein for purposes of clarity and simplicity. In FIG. 35, STA1 is the TXOP holder and may allow TXOP sharing with the AP and other STAs for uplink MU transmissions. STA1 may fail to correctly decode the trigger frame 1810 that is sent as a response to the TXOP sharing indication. In this example, there is no separate acknowledgement for the TXOP sharing indication. The UL MU transmission from the other stations is not received at STA1, and STA1 may perform PIFS recovery right after the failure of reception of the trigger frame 1810. Each of the frames 2402, 2802, and 2804 may be associated with a PIFS recovery attempt.

In one or more aspects, a frame may represent a PPDU or a PSDU. In an aspect, the PPDU may be the HE frame 600. For example, each of the frames 702, 704, 706, 708, 902, 1202, 1204, 1206, 1208, 1210, 1212, 1214, 1802, 1804, 1806, 1808, 1810, 1812, 1814, 1816, 1818, 1820, 1902, 1904, 1906, 1908, 1910, 1912, 1914, 1916, 2002, 2008, 2202, 2208, 2206, 2208, 2210, 2212, 2216, 2302, 2304, 2306, 2308, 2310, 2312, 2314, 2316, 2318, 2404, 2406, 2408, 2410, 2412, 2602, 2604, 2702, 2802, 2804, 2902, 2904, 3002, 3004, 3202, 3302, 3304, and 3402 as illustrated in the figures may represent a PPDU or a PSDU. The packets 2004A-C, 2006A-B, 2102-C, and 2214A-C may form portions of a PSDU. The horizontal dimension in FIGS. 4, 5, 7-10, 12, and 18-35 represents the time dimension. In some aspects, a time interval between any two frames in the foregoing description may be an SIFS, PIFS, or any other time interval. In this regard, each of xIFS and/or yIFS may be an SIFS, PIFS, or any other time interval. The xIFS and yIFS may be the same or may be different. Although the foregoing description makes reference to cases in which two EDCAFs collide (e.g., internally collide), the description also applies to cases in which more than two EDCAFs collide.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 36A:
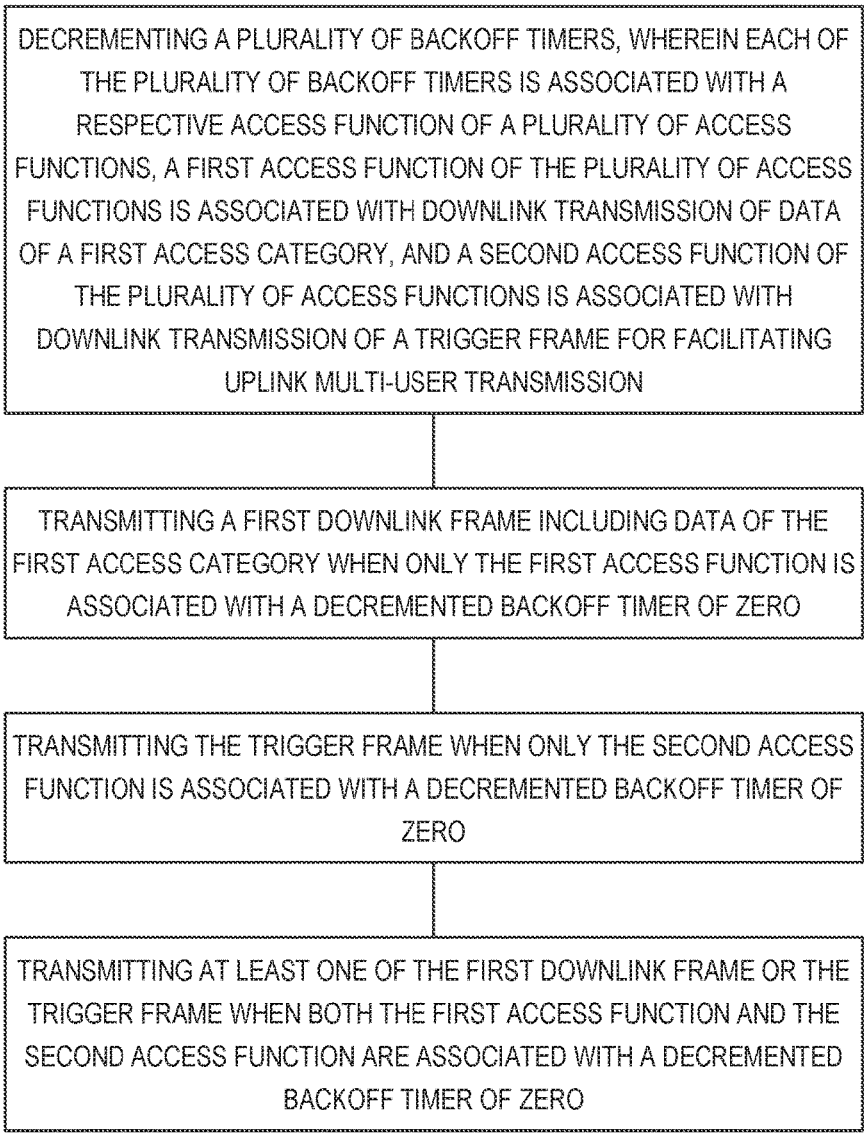
FIGS. 36A, 36B, and 36C illustrate flow charts of examples of methods for facilitating wireless communication for multi-user transmission.
Figure 36B:
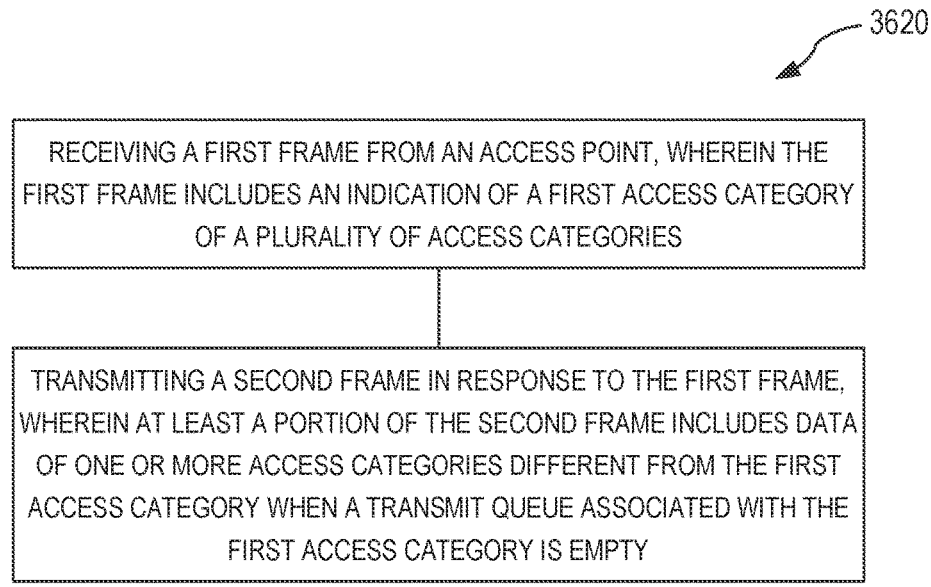
Figure 36C:
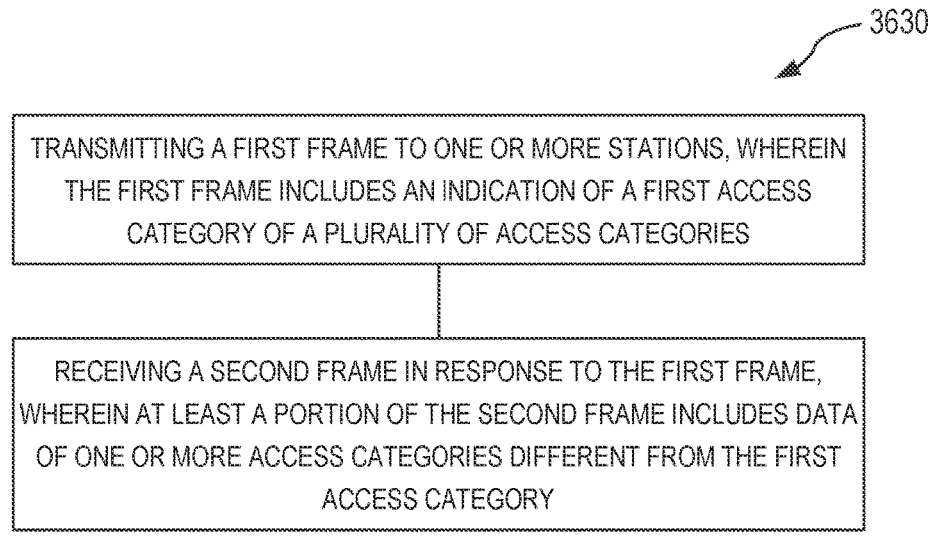

FIGS. 36A, 36B and 36C illustrate flow charts of examples of methods for facilitating wireless communication. For explanatory and illustration purposes, the example processes 3610, 3620 and 3630 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 3610, 3620 and 3630 are not limited to the wireless communication devices 111-115 of FIG. 1 or their components, and the example processes 3610, 3620 and 3630 may be performed by some of the devices shown in FIG. 1, or other devices or components. Further for explanatory and illustration purposes, the blocks of the example processes 3610, 3620 and 3630 are described herein as occurring in serial or linearly. However, multiple blocks of the example processes 3610, 3620 and 3630 may occur in parallel. In addition, the blocks of the example processes 3610, 3620 and 3630 need not be performed in the order shown and/or one or more of the blocks/actions of the example processes 3610, 3620 and 3630 need not be performed.

Various examples of aspects of the disclosure are described below as clauses for convenience. These are provided as examples, and do not limit the subject technology. As an example, some of the clauses described below are illustrated in FIGS. 36A, 36B and 36C.

Clause A. An access point for facilitating communication in a wireless network for multi-user transmission, the access point comprising: one or more memories; and one or more processors coupled to the one or more memories, the one or more processors configured to cause: decrementing a plurality of backoff timers, wherein each of the plurality of backoff timers is associated with a respective access function of a plurality of access functions, a first access function of the plurality of access functions is associated with downlink transmission of data of a first access category, and a second access function of the plurality of access functions is associated with downlink transmission of a trigger frame for facilitating uplink multi-user transmission; transmitting a first downlink frame comprising data of the first access category when only the first access function is associated with a decremented backoff timer of zero; transmitting the trigger frame when only the second access function is associated with a decremented backoff timer of zero; and transmitting at least one of the first downlink frame or the trigger frame when both the first access function and the second access function are associated with a decremented backoff timer of zero.

Clause B. A station for facilitating communication in a wireless network for multi-user transmission, the station comprising: one or more memories; and one or more processors coupled to the one or more memories, the one or more processors configured to cause: receiving a first frame from an access point, wherein the first frame comprises an indication of a first access category of a plurality of access categories; and transmitting a second frame in response to the first frame, wherein at least a portion of the second frame comprises data of one or more access categories different from the first access category when a transmit queue associated with the first access category is empty.

Clause C. An access point for facilitating communication in a wireless network for multi-user transmission, the access point comprising: one or more memories; and one or more processors coupled to the one or more memories, the one or more processors configured to cause: transmitting a first frame to one or more stations, wherein the first frame comprises an indication of a first access category of a plurality of access categories; and receiving a second frame in response to the first frame, wherein at least a portion of the second frame comprises data of one or more access categories different from the first access category.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point for facilitating communication in a wireless network for multi-user transmission, the access point comprising:
   one or more memories; and
   one or more processors coupled to the one or more memories, the one or more processors configured to cause:
   decrementing a plurality of backoff timers, wherein each of the plurality of backoff timers is associated with a respective access function of a plurality of access functions, the plurality of access functions including (1) a plurality of downlink access functions, which is each associated with a respective downlink queue and a corresponding access category from a set of access categories, and (2) a plurality of uplink access functions, which is each associated with a respective virtual uplink queue and a corresponding access category from the set of access categories, wherein a first downlink access function of the plurality of downlink access functions is associated with downlink transmission of data from a first downlink queue of a first access category from the set of access categories to one or more stations, wherein a first uplink access function of the plurality of uplink access functions is associated with downlink transmission of trigger frames from a first virtual uplink queue of the first access category for facilitating uplink multi-user transmissions of data of the first access category from a plurality of stations to the access point;
   transmitting a first downlink frame comprising data of the first access category from the first downlink queue when only the first downlink access function of the plurality of downlink access functions, which is associated with the first downlink queue, has a backoff timer that has decremented to zero;
   transmitting a second downlink frame comprising a trigger frame from the first virtual uplink queue when only the first uplink access function of the plurality of uplink access functions, which is associated with the first virtual uplink queue, has a backoff timer that has decremented to zero; and
   transmitting at least one of the first downlink frame or the second downlink frame when both the first downlink access function and the first uplink access function have a backoff timers that have been decremented to zero,
   wherein one or more of the first downlink frame or the trigger frame includes an indication that requests a plurality of stations to send data that is exclusive to a first access category and permits the plurality of stations to send data of an access category different from the first access category when a transmit queue for the first access category is empty.

2. The access point of claim 1, wherein the transmitting the at least one of the first downlink frame or the second downlink frame comprises:
   selecting one of the first downlink frame or the second downlink frame based at least in part on a respective priority associated with the first downlink access function and the first uplink access function; and
   transmitting the selected one of the first downlink frame or the second downlink frame.

3. The access point of claim 2, wherein the one or more processors are configured to cause setting a new backoff timer for first downlink access function when the first downlink frame is not selected or the first uplink access function when the second downlink frame is not selected.

4. The access point of claim 1, wherein the transmitting at least one of the first downlink frame or the second downlink frame comprises transmitting the trigger frame along with the first downlink frame to one or more stations, wherein the trigger frame comprises an indication of the first access category being a primary access category.

5. The access point of claim 4, wherein the one or more processors are configured to cause simultaneously receiving a respective uplink frame from each of the plurality of stations, the respective uplink frame being based on resource allocation information in the trigger frame.

6. The access point of claim 5, wherein the respective uplink frame from at least one of the plurality of stations comprises data of the first access category.

7. The access point of claim 5, wherein the respective uplink frame of one of the plurality of stations comprises data of an access category different from the first access category when a transmit queue of the one of the plurality of stations for the first access category is empty.

8. The access point of claim 1, wherein:
the trigger frame comprises an indication of a primary access category, wherein the primary access category is based at least in part on a respective queue status associated with one or more stations.

9. The access point of claim 1, wherein the at least one of the first downlink frame or the second downlink frame is of a higher priority than the other one of the first downlink frame or the second downlink frame.

10. The access point of claim 1, wherein:
a second downlink access function of the plurality of downlink access functions is associated with downlink transmission of data from a first downlink queue of a second access category from the set of access categories to one or more stations, wherein a second uplink access function of the plurality of uplink access functions is associated with downlink transmission of trigger frames from a second virtual uplink queue of the first access category for facilitating uplink multi-user transmissions of data of the second access category from a plurality of stations to the access point, wherein the one or more processors are configured to cause:
transmitting a third downlink frame comprising data of the second access category from the second downlink queue when the second downlink access function of the plurality of downlink access functions, which is associated with the second downlink queue, has a backoff timer that has been decremented to zero; and
transmitting a fourth downlink frame comprising a trigger frame from the second virtual uplink queue when only second uplink access function of the plurality of uplink access functions, which is associated with the second virtual uplink queue has a backoff timer that has been decremented to zero.

11. The access point of claim 1, wherein the one or more processors are configured to cause:
estimating a total queue size for a primary access category from a plurality of stations participating in the uplink multi-user transmission; and
determining a transmission opportunity (TXOP) duration using the estimated total queue size.

12. The access point of claim 1, wherein a number of virtual uplink queues associated with the plurality of uplink access functions is different from a number of downlink queues associated with the plurality of downlink access functions.

13. An access point for facilitating communication in a wireless network for multi-user transmission, the access point comprising:
one or more memories; and
one or more processors coupled to the one or more memories, the one or more processors configured to cause:
decrementing a backoff timer for a first access function of a plurality of access functions, the plurality of access functions including (1) a plurality of downlink access functions, which is each associated with a respective downlink queue and a corresponding access category from a set of access categories, and (2) a plurality of uplink access functions, which is each associated with a respective virtual uplink queue and a corresponding access category from the set of access categories, wherein a first uplink access function of the plurality of uplink access functions is associated with downlink transmission of trigger frames from a first virtual uplink queue of a first access category from the set of access categories for facilitating uplink multi-user transmissions of data of the first access category from a plurality of stations to the access point;
transmitting a first frame from the first virtual uplink queue to one or more stations, wherein the first frame comprises an indication that requires the one or more stations to send data that is exclusive to the first access category and permits the one or more stations to send data of an access category different from the first access category only when a transmit queue of a station for the first access category is empty; and
receiving a second frame in response to the first frame, wherein at least a portion of the second frame comprises data of one or more access categories different from the first access category.

14. The access point of claim 13, wherein the one or more processors are configured to cause selecting the first access category from among the plurality of access categories based at least in part on queue status information from the one or more stations.

15. A device for facilitating communication in a wireless network for multi-user transmission, the device comprising:
one or more memories; and
one or more processors coupled to the one or more memories, the one or more processors configured to cause:
decrementing a plurality of backoff timers, wherein each of the plurality of backoff timers is associated with a respective access function of a plurality of access functions, the plurality of access functions including (1) a plurality of downlink access functions, which is each associated with a respective downlink queue and a corresponding access category from a set of access categories, and (2) a plurality of uplink access functions, which is each associated with a respective virtual uplink queue and a corresponding access category from the set of access categories, wherein a first downlink access function of the plurality of downlink access functions is associated with downlink transmission of data from a first downlink queue of a first access category from the set of access categories to one or more stations, wherein a first uplink access function of the plurality of uplink access functions is associated with downlink transmission of trigger frames from a first virtual uplink queue of the first access category for facilitating uplink multi-user transmissions of data of the first access category from a plurality of stations to an access point;
transmitting a first downlink frame comprising data of the first access category from the first downlink queue when only the first downlink access function of the plurality of downlink access functions, which is associated with the first downlink queue, has a backoff timer that has decremented to zero;
transmitting a second downlink frame comprising a trigger frame from the first virtual uplink queue when only the first uplink access function of the plurality of uplink access functions, which is associated with the first virtual uplink queue, has a backoff timer that has decremented to zero; and transmitting at least one of the first downlink frame or the second downlink frame when both the first downlink access function and the first uplink access function have a backoff timers that have been decremented to zero.

16. A computer-readable medium encoded with instructions that, when executed by a processor, cause the processor to perform operations comprising:

decrementing a plurality of backoff timers, wherein each of the plurality of backoff timers is associated with a respective access function of a plurality of access functions, the plurality of access functions including (1) a plurality of downlink access functions, which is each associated with a respective downlink queue and a corresponding access category from a set of access categories, and (2) a plurality of uplink access functions, which is each associated with a respective virtual uplink queue and a corresponding access category from the set of access categories, wherein a first downlink access function of the plurality of downlink access functions is associated with downlink transmission of data from a first downlink queue of a first access category from the set of access categories to one or more stations, wherein a first uplink access function of the plurality of uplink access functions is associated with downlink transmission of trigger frames from a first virtual uplink queue of the first access category for facilitating uplink multi-user transmissions of data of the first access category from a plurality of stations to an access point;

transmitting a first downlink frame comprising data of the first access category from the first downlink queue when only the first downlink access function of the plurality of downlink access functions, which is associated with the first downlink queue, has a backoff timer that has decremented to zero;

transmitting a second downlink frame comprising a trigger frame from the first virtual uplink queue when only the first uplink access function of the plurality of uplink access functions, which is associated with the first virtual uplink queue, has a backoff timer that has decremented to zero; and transmitting at least one of the first downlink frame or the second downlink frame when both the first downlink access function and the first uplink access function have a backoff timers that have been decremented to zero.

* * * * *